(12) United States Patent
Ono et al.

(10) Patent No.: US 11,118,087 B2
(45) Date of Patent: Sep. 14, 2021

(54) FILM-FORMING RESIN COMPOSITION, LAMINATED FILM, AND ARTICLE TO WHICH LAMINATED FILM IS ATTACHED

(71) Applicant: NATOCO CO., LTD., Aichi (JP)

(72) Inventors: Susumu Ono, Nagoya (JP); Takashi Tanaka, Nagoya (JP); Takafumi Yoshino, Nagoya (JP)

(73) Assignee: NATOCO CO., LTD., Aichi (JP)

( * ) Notice: Subject to any disclaimer, the term of this patent is extended or adjusted under 35 U.S.C. 154(b) by 0 days.

(21) Appl. No.: 16/978,495

(22) PCT Filed: Feb. 13, 2019

(86) PCT No.: PCT/JP2019/004975
§ 371 (c)(1),
(2) Date: Sep. 4, 2020

(87) PCT Pub. No.: WO2019/176416
PCT Pub. Date: Sep. 19, 2019

(65) Prior Publication Data
US 2021/0009856 A1 Jan. 14, 2021

(30) Foreign Application Priority Data
Mar. 13, 2018 (JP) .............................. JP2018-045055

(51) Int. Cl.
*C09D 183/04* (2006.01)
*C08G 18/10* (2006.01)
(Continued)

(52) U.S. Cl.
CPC ........... *C09D 183/04* (2013.01); *C08G 18/10* (2013.01); *C08G 18/6229* (2013.01); *C09D 133/14* (2013.01); *C09D 175/04* (2013.01)

(58) Field of Classification Search
CPC ..................................................... C09D 175/04
See application file for complete search history.

(56) References Cited

U.S. PATENT DOCUMENTS

| 5,594,065 A | 1/1997 | Tien et al. |
| 10,513,586 B2 | 12/2019 | Kondo et al. |

(Continued)

FOREIGN PATENT DOCUMENTS

| CN | 102533078 A | 7/2012 |
| CN | 107216792 A | 9/2017 |

(Continued)

OTHER PUBLICATIONS

Google Translation of WO 2012081642 (Year: 2021).*

(Continued)

*Primary Examiner* — Michael M Dollinger
(74) *Attorney, Agent, or Firm* — Rankin, Hill & Clark LLP

(57) ABSTRACT

Provided is a film-forming resin composition for protecting an article that an organic polymer is exposed, including a polyurethane resin (A) having a hydroxyl group, a (meth) acrylic resin (B) having a hydroxyl group, and a polyfunctional isocyanate (C), in which the composition has a cross-linking density n of $1.0 \times 10^{-4}$ to $5.0 \times 10^{-3}$ mol/cm$^3$, which is determined according to Mathematical Formula (1) $n=E'_{min}/(3RT)$. Here, $E'_{min}$ represents a minimum value E'min of storage elastic modulus of a cured film obtained by curing the resin composition at 80° C. for 16 hours in a case where the cured film is subjected to viscoelasticity measurement at a frequency of 1.0 Hz and a temperature range of −40° C. to 160° C., T represents an absolute temperature at the minimum value $E'_{min}$, and R represents a gas constant.

11 Claims, 1 Drawing Sheet

(51) Int. Cl.
*C08G 18/62* (2006.01)
*C09D 133/14* (2006.01)
*C09D 175/04* (2006.01)

(56) References Cited

U.S. PATENT DOCUMENTS

| | | | |
|---|---|---|---|
| 2015/0275036 A1* | 10/2015 | Ichimura | C25D 13/12 |
| | | | 205/50 |
| 2015/0275037 A1* | 10/2015 | Ichimura | C09D 175/06 |
| | | | 428/423.1 |
| 2016/0184213 A1 | 6/2016 | Abe | |
| 2017/0029645 A1* | 2/2017 | Iuchi | C09D 11/40 |
| 2018/0086882 A1 | 3/2018 | Kondo et al. | |

FOREIGN PATENT DOCUMENTS

| | | |
|---|---|---|
| CN | 107429113 A | 12/2017 |
| JP | 9-3400 A | 1/1997 |
| JP | 2002-155126 A | 5/2002 |
| JP | 2008-238771 A | 10/2008 |
| JP | 2010-53231 A | 3/2010 |
| JP | 2011-207953 A | 10/2011 |
| JP | 2014-075413 A | 4/2014 |
| JP | 2014-141654 A | 8/2014 |
| JP | 2016-108347 A | 6/2016 |
| JP | 6340539 B1 | 6/2018 |
| WO | 2012/081642 A1 | 6/2012 |
| WO | 2015/046300 A1 | 4/2015 |
| WO | 2016/159023 A1 | 10/2016 |

OTHER PUBLICATIONS

Espacenet Translation of JP 2008238771 (Year: 2021).*
Espacenet Translation of JP 2011207953 (Year: 2021).*
International Search Report (ISR) dated May 14, 2019 filed in PCT/JP2019/004975.

* cited by examiner

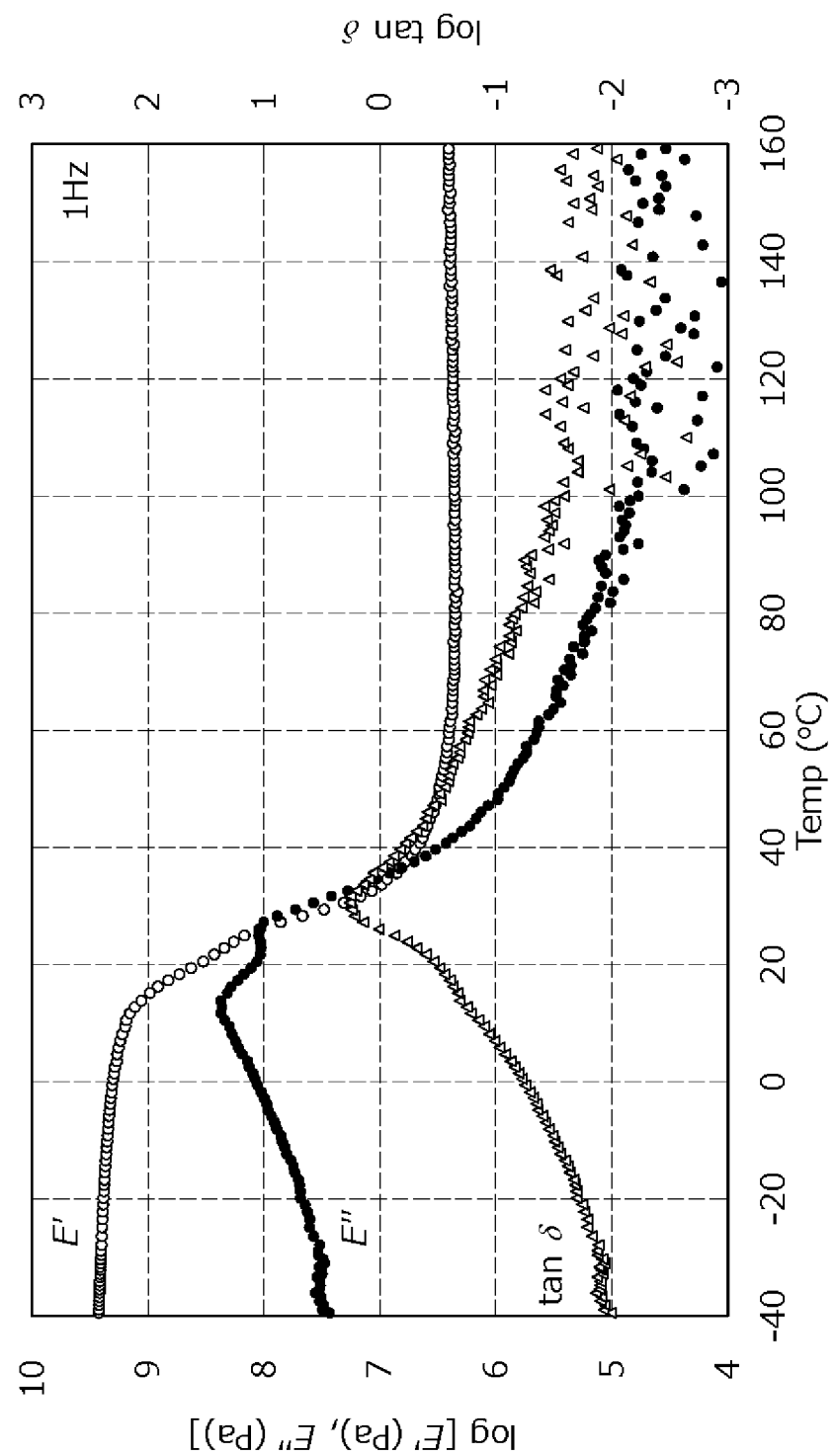

FILM-FORMING RESIN COMPOSITION, LAMINATED FILM, AND ARTICLE TO WHICH LAMINATED FILM IS ATTACHED

TECHNICAL FIELD

The present invention relates to a film-forming resin composition, a laminated film, and an article to which the laminated film is attached. More specifically, the present invention relates to a film-forming resin composition for protecting an article that an organic polymer is exposed, a laminated film for protecting an article that an organic polymer is exposed, and an article to which the laminated film is attached.

BACKGROUND ART

In the technical field of paints and coatings, various researches and developments have been made so far on paints and coatings intended to prevent scratches and self-heal scratches.

For example, Patent Document 1 discloses a coating composition containing (1) an acrylic polyol having a weight average molecular weight of 5,000 to 30,000, (2) a polycarbonate diol having a number average molecular weight of 300 to 1,500, and (3) a polyisocyanate having 0.6 to 1.5 molar equivalents of isocyanate groups with respect to a total of hydroxyl groups in the acrylic polyol and the polycarbonate diol. In addition, it is disclosed in Patent Document 1 that, in a case where a coating film is formed on a surface of a plastic molded article with this coating composition, the scratched coating film has a restoring property of returning to an original state thereof.

In addition, Patent Document 2 discloses a self-healing coating composition obtained by reacting an organic polyisocyanate, an acrylic polyol, and a polycarbonate polyol. Here, the organic polyisocyanate is a modified polyisocyanate having equal to or more than 3.0 functional groups, and the polycarbonate polyol has a number average molecular weight of 250 to 750.

RELATED DOCUMENT

Patent Document

[Patent Document 1] Japanese Unexamined Patent Publication No. 2011-207953
[Patent Document 2] Japanese Unexamined Patent Publication No. 2016-108347

SUMMARY OF THE INVENTION

Technical Problem

In recent years, a "paint protection film" (hereinafter, also simply referred to as PPF) that is attached to a painted surface of a vehicle body of an automobile, a motorcycle or the like to protect the painted surface of the vehicle body from flying stones and dirt has been actively studied.

The PPF needs to be attached to a vehicle body having many curved surfaces. Therefore, the PPF is usually constituted of a deformable resin (typically thermoplastic polyurethane). In a case where the PPF is attached to the painted surface of the vehicle body, the PPF can be attached without any gap to the painted surface while being deformed according to the curved surface of the vehicle body.

The PPF protects the painted surface of the vehicle body from external forces and dirt, but it is conceivable that the PPF is made to have higher functionality, such as enhancing the scratch resistance of PPF itself, in addition to protecting the painted surface of the vehicle body. Specifically, it is conceivable to provide a functional resin film having a function such as scratch resistance on the side of the PPF opposite to the surface in contact with the painted surface of the vehicle body.

Here, as described above, in a case where the PPF is attached to the painted surface of the vehicle body, the PPF is attached while being stretched (deformed) so as to match the curved surface of the vehicle body. Therefore, in a case where a functional resin film is provided on the PPF, it is necessary to design the resin film such that the resin film is easily stretched and is unlikely to break.

However, in a case where the functional resin film is designed to stretch easily, there is a concern that the functional resin film may not have sufficient scratch resistance. Specifically, scratch resistance is considered to be the performance that is expressed by the fact that the functional resin film is "hard" to some extent (it is difficult to deform), but in a case where the functional resin film is designed to be stretchable (deformable), sufficient scratch resistance may not be obtained. On the other hand, in a case where the functional resin film is designed to be hard (designed to be difficult to stretch), there is a possibility that the resin film may be broken due to the deformation thereof in a case of being attached to the painted surface of the vehicle body.

The present invention has been made in view of such circumstances. That is, one of the objects of the present invention is to provide a film-forming resin composition which is easily stretchable and has good scratch resistance in a case of being formed into a film.

Solution to Problem

Through various studies, the present inventors have found that there is a tendency of easily achieving both stretchability and scratch resistance by using a polyurethane resin (A) having a hydroxy group, a (meth)acrylic resin (B) having a hydroxy group, and a polyfunctional isocyanate (C) as components constituting a film-forming resin composition.

In addition, as a result of another study, the present inventors have found that a "cross-linking density" of a cured film obtained by heat-curing the composition is related to the performance such as stretchability and scratch resistance.

Based on these findings, the present inventors newly designed a film-forming resin composition having a cross-linking density within a certain numerical range in a case of being heat-cured.

Specifically, the present inventors have completed the following inventions and found that the foregoing object can be achieved by the following inventions.

According to the present invention, the following is provided.

A film-forming resin composition for protecting an article that an organic polymer is exposed, including:
a polyurethane resin (A) having a hydroxy group;
a (meth)acrylic resin (B) having a hydroxy group; and
a polyfunctional isocyanate (C),
in which a cured film obtained by curing the resin composition at 80° C. for 16 hours has a cross-linking density n of $1.0 \times 10^{-4}$ to $5.0 \times 10^{-3}$ mol/cm$^3$, which is determined from a minimum value $E'_{min}$ of storage elastic modulus of the cured film in a case where the cured film is subjected to viscoelasticity measurement at a frequency of 1.0 Hz and a temperature range of −40° C. to 160° C., an absolute temperature T at the minimum value E′$_{min}$, and a gas constant R, according to Mathematical Formula (1).

$$n = E'_{min}/(3RT) \quad \text{Mathematical Formula (1)}$$

In addition, the following is provided according to the present invention.

A laminated film for protecting a surface of an article that an organic polymer is exposed, including:

a base material layer; and a protective layer, in which the protective layer has a cross-linking density n of $1.0 \times 10^{-4}$ to $5.0 \times 10^{-3}$ mol/cm$^3$, which is determined from a minimum value E′$_{min}$ of storage elastic modulus of the protective layer in a case where the protective layer is subjected to viscoelasticity measurement at a frequency of 1.0 Hz and a temperature range of −40° C. to 160° C., an absolute temperature T at the minimum value E′$_{min}$, and a gas constant R, according to Mathematical Formula (1).

$$n = E'_{min}/(3RT) \quad \text{Mathematical Formula (1)}$$

Advantageous Effects of Invention

According to the present invention, it is possible to obtain a film-forming resin composition which is easily stretchable and has good scratch resistance in a case of being formed into a film.

BRIEF DESCRIPTION OF THE DRAWINGS

The above and other objects, features, and advantages of the present invention will be more apparent from the following description of certain preferred embodiments taken in conjunction with the accompanying drawings.

FIG. 1 is a graph showing the results of viscoelasticity measurement in Examples.

DESCRIPTION OF EMBODIMENTS

Hereinafter, embodiments of the present invention will be described in detail with reference to the drawings.

In the present specification, the expression "a to b" in the description of the numerical range means "equal to or more than a" and "equal to or less than b". For example, "1% to 5% by mass" means "equal to or more than 1% by mass and equal to or less than 5% by mass".

In the expression of a group (atomic group) in the present specification, the expression that does not indicate whether it is substituted or unsubstituted includes both those having no substituent and those having a substituent. For example, the "alkyl group" includes not only an alkyl group having no substituent (unsubstituted alkyl group) but also an alkyl group having a substituent (substituted alkyl group).

The expression "(meth)acrylic" in the present specification means a concept including both acrylic and methacrylic. The same applies to similar expressions such as "(meth)acrylate".

In the present specification, the "hydroxyl value" is determined in accordance with the method specified in "7.1 Neutralization titration method" of JIS K0070 "Test method for acid value, saponification value, ester value, iodine value, hydroxyl value and unsaponifiable matter of chemical products". The value of the acid value is also required in a case of calculating the hydroxyl value, but the value of the acid value is also determined in accordance with the method specified in "3.1 Neutralization titration method" of the same JIS standard.

Film-Forming Resin Composition

The film-forming resin composition of the present embodiment is used to protect an article that an organic polymer is exposed, and includes a polyurethane resin (A) having a hydroxy group, a (meth)acrylic resin (B) having a hydroxy group, and a polyfunctional isocyanate (C) (the composition may optionally further include a polysiloxane compound (D) and a polyol (E), each having a hydroxy group, which will be described later). Then, a cured film obtained by curing the resin composition at 80° C. for 16 hours has a cross-linking density n of $1.0 \times 10^{-4}$ to $5.0 \times 10^{-3}$ mol/cm$^3$, which is determined from a minimum value E′$_{min}$ of storage elastic modulus of the cured film in a case where the cured film is subjected to viscoelasticity measurement at a frequency of 1.0 Hz and a temperature range of −40° C. to 160° C., an absolute temperature T at the E′$_{min}$, and a gas constant R, according to Mathematical Formula (1).

$$n = E'_{min}/(3RT) \quad \text{Mathematical Formula (1)}$$

Hereinafter, the polyurethane resin (A) having a hydroxy group is also referred to as "resin (A)". In addition, the (meth)acrylic resin (B) having a hydroxy group is also referred to as "resin (B)".

The reason why such a film-forming resin composition makes the film be easily stretchable and have good scratch resistance in a case of being formed into a film is not always clear, but it can be presumed as follows. The following speculations do not limit the scope of the present invention.

The film-forming resin composition of the present embodiment includes two different resins, that is, a resin (A) and a resin (B), as a resin capable of reaction (cross-linking reaction) with the polyfunctional isocyanate (C).

It is assumed that, in a case where a cured film is formed using the film-forming resin composition of the present embodiment, due to such a configuration in which the composition "includes two different resins", there are a portion having a low cross-linking density (a portion having a large molecular weight between cross-linking points) and a portion having a high cross-linking density (a portion having a small molecular weight between cross-linking points) in the cured film in a case of being viewed microscopically.

Of these, it is assumed that the presence of the former portion makes the cured film moderately soft, thus securing the stretchability of the film. On the other hand, it is assumed that the presence of the latter portion makes the cured film moderately hard and dense, thus securing the scratch resistance of the film.

It is assumed that the presence of both the portion having a low cross-linking density and the portion having a high cross-linking density in appropriate amounts makes the film be easily stretchable and have good scratch resistance in a case of being formed into a film.

It is assumed that the cross-linking density n is in the range of $1.0 \times 10^{-4}$ to $5.0 \times 10^{-3}$ mol/cm$^3$ means the state in which both the portion having a low cross-linking density and the portion having a high cross-linking density are present in appropriate amounts respectively" is quantitatively expressed as the average of the entire film.

In other words, it can be said that the film is made to be easily stretchable and have good scratch resistance in a case of being formed into a film, by forming a film containing a portion having a low cross-linking density and a portion having a high cross-linking density (in a case of being viewed microscopically) through cross-linking of two different resins with a polyfunctional isocyanate such that a macroscopic cross-linking density n of the cured film as a whole is in the range of $1.0 \times 10^{-4}$ to $5.0 \times 10^{-3}$ mol/cm$^3$.

To supplement about the scratch resistance, in a case where a cured film is formed using the film-forming resin composition of the present embodiment, the formed film has good scratch resistance against various types of scratches. Here, the "various types of scratches" are, for example, "shallow and thin continuous scratches" that can be made in a case where a film is rubbed with a hard fiber such as steel wool, and "scratched wounds" caused by a brass brush or the like having a thin tip.

The reason for the good scratch resistance against various types of scratches is not always clear, but it is presumed that the good scratch resistance is related to the fact that a part having a high cross-linking density and a part having a low cross-linking density may coexist in the film.

The method of setting the cross-linking density n in the above range is not particularly limited, and examples thereof include a method of adjusting a molecular weight of the resin (A) or the resin (B), a method of adjusting an amount of hydroxy groups contained in the resin (A) or the resin (B) (adjusting a hydroxyl value of the resin (A) or the resin (B)), a method of adjusting the number of functional groups (an amount of functional groups) in the polyfunctional isocyanate (C), and a method of appropriately adjusting a content of each component in the composition.

By including a polysiloxane structure in some form in the resin composition of the present embodiment, it is possible to improve the resistance to staining (contamination resistance) of a film in a case where the composition is formed into a film.

The method of incorporating the polysiloxane structure into the composition is not particularly limited, and examples thereof include a method of introducing a polysiloxane partial structure into the resin (A) and/or the resin (B), and a method of separately adding a polysiloxane compound (D) having a hydroxy group to the composition (Details of these will be described later).

In addition, by including at least any flexible chemical structure selected from the group consisting of polycaprolactone, polycaprolactam, polycarbonate, polyester, and polyether in some form in the resin composition of the present embodiment, not only the scratch resistance can be improved, but also scratch self-healing properties (the property that a scratch disappears or becomes inconspicuous over time even in a case where the scratch occurs) can be improved in a case where the composition is formed into a film (cured film).

Examples of the method of incorporating any of the above-mentioned partial structures into the composition include a method of using a resin (A) and/or a resin (B) having these partial structures introduced therein, and a method of using a polyol (E) having these partial structures as will be described later (the details of which will be described later).

Hereinafter, components included (or components that may be included) in the film-forming resin composition of the present embodiment, the physical properties, the properties, and the like will be described more specifically.

Polyurethane Resin (A) Having Hydroxy Group (Resin (A))

The film-forming resin composition of the present embodiment includes a polyurethane resin (A) having a hydroxy group (resin (A)).

The resin (A) is not particularly limited as long as it is a resin having a plurality of urethane bonds and a hydroxy group. The resin (A) can be usually obtained by a polyaddition reaction of a compound having an isocyanate group with a polyol. The resin (A) usually has a hydroxy group in the form of a terminal structure or the like derived from a polyol.

Hereinafter, a compound having an isocyanate group (hereinafter, also referred to as an isocyanate compound) and a polyol, which are raw materials of the resin (A), will be described.

Isocyanate Compound

The isocyanate compound is preferably a polyfunctional compound, that is, a compound having two or more isocyanate groups (including an isocyanate group protected by a leaving group) in one molecule. The number of functional groups in the isocyanate compound is more preferably 2 to 6 per molecule, still more preferably 2 to 4 per molecule, and particularly preferably 2 per molecule.

The amount of the isocyanate groups contained in the isocyanate compound can be expressed by the percentage of the mass of isocyanate groups (—NCO) to the whole compound. The mass percentage of the isocyanate groups (also referred to as NCO %) to the whole isocyanate compound is, for example, 10% to 60% and preferably 15% to 55%.

Examples of the isocyanate compound include aliphatic diisocyanates such as lysine diisocyanate, hexamethylene diisocyanate and trimethylhexane diisocyanate; cyclic aliphatic diisocyanates such as hydrogenated xylylene diisocyanate, isophorone diisocyanate, methylcyclohexane-2,4- (or 2,6)-diisocyanate, 4,4'-methylenebis(cyclohexylisocyanate) and 1,3-(isocyanatomethyl)cyclohexane; and tri- or higher functional isocyanates such as lysine triisocyanate.

Examples of the isocyanate compound also include isocyanate multimers such as so-called isocyanurates, biurets, adducts, and allophanates, and compounds obtained by adding an isocyanate compound to a polyhydric alcohol or a low molecular weight polyester resin.

The isocyanate compound may be in the form of so-called blocked isocyanate as long as it reacts with a diol.

Examples of the isocyanate compound particularly include diisocyanate compounds such as hexamethylene diisocyanate, isophorone diisocyanate, tolylene diisocyanate, xylylene diisocyanate, hydrogenated xylylene diisocyanate, diphenylmethane diisocyanate, and hydrogenated diphenylmethane diisocyanate. In addition, an allophanate-modified polyisocyanate such as TAKENATE D-178NL (manufactured by Mitsui Chemicals, Inc.) can also be mentioned.

As the isocyanate compound, those not containing a conjugated ring structure such as isophorone diisocyanate are particularly preferable from the viewpoint of little change in hue over time.

Polyol

The number of hydroxy groups in one molecule of the polyol is usually equal to or more than 2, preferably 2 to 6, more preferably 2 to 4, and particularly preferably 2 (that is, the polyol here is particularly preferably a diol)

The polyol is preferably at least any selected from the group consisting of polycaprolactone polyol, polycaprolactam polyol, polycarbonate polyol, polyester polyol, and polyether polyol.

A flexible molecular skeleton can be introduced into the resin (A) by synthesizing the resin (A) using any of these polyols. It is assumed that this improves not only the scratch resistance but also the scratch self-healing properties.

Above all, the polyol is particularly preferably a polycarbonate polyol or a polyester polyol among which a polycarbonate diol or a polyester diol is particularly preferable.

As the polycarbonate polyol, any compound having a carbonate group represented by —O—(C=O)—O— and two or more hydroxy groups in one molecule can be used without particular limitation.

More specific examples of the polycarbonate polyol include polycarbonate polyols produced by a known method, in addition to the commonly used one having 1,6-hexanediol as a basic skeleton. Examples thereof include polycarbonate polyols obtained by reacting a carbonate component such as alkylene carbonate, diaryl carbonate or dialkyl carbonate or a phosgene with an aliphatic polyol component. Examples of the aliphatic polyol component include linear glycols such as 1,3-propanediol, 1,4-butanediol and 1,6-hexanediol; branched glycols such as 1,2-propanediol, neopentyl glycol, 3-methyl-1,5-pentanediol and ethylbutylpropanediol; and ether dials such as diethylene glycol and triethylene glycol. Among these, linear glycols are preferable from the viewpoint of appropriate flexibility (and further, scratch-healing properties) of the resin (A).

As the polyester polyol, any compound having an ester bond and two or more hydroxy groups in one molecule can be used without particular limitation.

More specifically, the polyester polyol may be, for example, a terminal hydroxyl group-containing ester compound obtained by esterifying at least one dicarboxylic acid and at least one polyol such as a polyhydric alcohol, a polyhydric phenol, or an alkoxy-modified product thereof.

Examples of the dicarboxylic acid include dicarboxylic acids such as terephthalic acid, isophthalic acid, orthophthalic acid, 1,5-naphthalic acid, p-oxybenzoic acid, p-(hydroxy)benzoic acid, 1,4-cyclohexanedicarboxylic acid, succinic acid, adipic acid, azelaic acid, sebacic acid, and dodecanedicarboxylic acid.

Examples of the polyhydric alcohol include 1,3-propanediol, 2-methyl-1,3-propanediol, 1,4-butanediol, 2-methyl-1,4-butanediol, 1,2-dimethyl-1,4-butanediol, 2-ethyl-1,4-butanediol, 1,5-pentanediol, 2-methyl-1,5-pentanediol, 3-methyl-1,5-pentanediol, 2,2,4-trimethyl-1,3-pentanediol, 3-ethyl-1,5-pentanediol, 1,6-hexanediol, 2-methyl-1,6-hexanediol, 3-methyl-1,6-hexanediol, 1,7-heptanediol, 2-methyl-1,7-heptanediol, 3-methyl-1,7-heptanediol, 4-methyl-1,7-heptanediol, 1,8-octanediol, 2-methyl-1,8-octanediol, 2-ethyl-1,8-octanediol, 3-methyl-1,8-octanediol, 4-methyl-1,8-octanediol, 1,9-nonanediol, ethylene glycol, propylene glycol, neopentyl glycol, diethylene glycol, dipropylene glycol, cyclohexanedimethanol, polyethylene glycol, polypropylene glycol, polytetramethylene glycol, trimethylolpropane, 1,1,1-trimethylolpropane ethylene glycol, glycerin, erythritol, xylitol, sorbitol, and mannitol.

For example, a branched alkane diol is preferable as the polyhydric alcohol from the viewpoint of appropriate flexibility (and further, scratch-healing properties) of the resin (A), and appropriate film strength.

Examples of the polyphenol include catechol, resorcin, hydroquinone, hexylresorcin, trihydroxybenzene, and dimethylolphenol.

The resin (A) preferably has at least any partial structure selected from the group consisting of polycaprolactone, polycaprolactam, polycarbonate, polyester, and polyether. It is assumed that not only scratch resistance (hardness to scratch) but also scratch self-healing properties can be improved by including such a partial structure.

In order to allow the resin (A) to have the above-mentioned partial structure, for example, as described above, at least any polyol selected from the group consisting of polycaprolactone polyol, polycaprolactam polyol, polycarbonate polyol, polyester polyol, and polyether polyol may be used as the polyol of the raw material of the resin (A).

In one aspect, the resin (A) preferably has a polysiloxane partial structure. It is assumed that the contamination resistance, such as further suppression of dirt adhesion and further suppression of dirt infiltration, can be further enhanced in a case where the resin (A) has such a partial structure.

The method of introducing the polysiloxane partial structure into the resin (A) is not particularly limited. For example, in a case of synthesizing the resin (A), a polysiloxane compound having a hydroxy group may be used as a part of the polyol. Those sold as "carbinol-modified silicone oil" from Shin-Etsu Chemical Co., Ltd., Dow Corning Toray Co., Ltd., or the like can be used as such a polysiloxane compound.

The hydroxyl value of the resin (A) is preferably 10 to 200 mgKOH/g, more preferably 30 to 150 mgKOH/g, and still more preferably 40 to 120 mgKOH/g. It is assumed that setting the hydroxyl value of the resin (A) in this range makes it easier to form the above-mentioned "film containing a portion having a low cross-linking density and a portion having a high cross-linking density", and as a result, the stretchability and scratch resistance can be further improved.

The resin (A) typically has a hydroxy group mainly at a terminal thereof. Therefore, for example, the hydroxyl value of the resin (A) can be adjusted by adjusting the average molecular weight of the The number average molecular weight of the resin (A) is preferably 500 to 25,000, more preferably 750 to 10,000, and still more preferably 1,000 to 5,000. In addition, the weight average molecular weight of the resin (A) is preferably 1,000 to 50,000, more preferably 1,500 to 20,000, and still more preferably 2,000 to 10,000. The stretchability and scratch resistance in a case of being formed into a film can be further improved by appropriately adjusting the number average molecular weight and the weight average molecular weight.

The resin (A) may be used alone or in combination of two or more thereof.

The content of the resin (A) in the composition is preferably 1% to 90% by mass, more preferably 2% to 85% by mass, and still more preferably 5% to 80% by mass with respect to the total non-volatile components in the composition.

(Meth)Acrylic Resin (B) Having Hydroxy Group
(Resin (B))

The film-forming resin composition of the present embodiment includes a (meth)acrylic resin (B) having a hydroxy group (resin (B)). In a case where the resin (B) is a copolymer, the form thereof may be random, block, graft, or the like.

The hydroxy group may be present at any position of the resin (B), such as the side chain, main chain or terminal of the resin (B). The hydroxy group is preferably present at least in the side chain of the resin (B) for reasons such as the ease of synthesis, the ease of adjusting the hydroxyl value, and the ease with which the hydroxy groups are evenly present in the resin (B).

The resin (B) preferably has at least any partial structure selected from the group consisting of polycaprolactone, polycaprolactam, polycarbonate, polyester, and polyether. It is assumed that the effect of scratch self-healing properties can be obtained in a case where the resin (B) has such a flexible partial structure.

To introduce such a partial structure into the resin (B), for example, a monomer having any of the above-mentioned partial structures may be polymerized (details of which will be described later). Alternatively, any of the above-mentioned partial structures may be introduced into the resin (B) by a polymer reaction.

In one aspect, the resin (B) preferably has a polysiloxane partial structure. It is assumed that the contamination resistance, such as further suppression of dirt adhesion and further suppression of dirt infiltration, can be further enhanced in a case where the resin (B) has such a partial structure.

In addition, since the resin (B) has a hydroxy group, it reacts with the polyfunctional isocyanate (C) in the film to form a cross-linked structure. It is assumed that this can reduce the problem of so-called bleed-out (deposition on the film surface) of the resin (B) itself or the polysiloxane partial structure contained in the resin (B).

The method of introducing the polysiloxane partial structure into the resin (B) is not particularly limited. For example, there is a method of introducing a structural unit (b-1) which will be described later into the resin (B).

Hereinafter, the structural unit preferably contained in the resin (B) will be described with specific examples of the monomer structure corresponding to the structural unit.

Structural Unit (b-1)

The resin (B) preferably contains a (meth) acrylate structural unit having a polysiloxane partial structure in the side chain thereof (also referred to as a structural unit (b-1)). The resin (B) may contain only one type of structural unit corresponding to the structural unit (b-1), or may contain two or more types of structural units corresponding to the structural unit (b-1).

The structural unit (b-1) may be, for example, a structural unit derived from a monomer represented by General Formula (SX-1), (SX-2), or (SX-3).

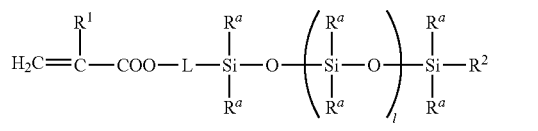
(SX-1)

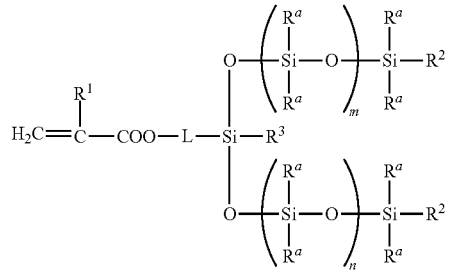
(SX-2)

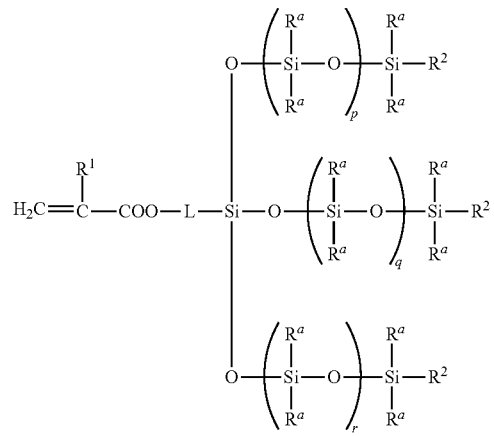
(SX-3)

In General Formulae (SX-1), (SX-2), and (SX-3),
$R^1$ is a hydrogen atom or a methyl group,
L is a divalent linking group,
a plurality of $R^a$'s are each independently a hydrogen atom or a monovalent organic group,
in a case where a plurality of $R^2$'s are present, $R^2$'s are each independently a hydrogen atom or a monovalent organic group,
$R^3$ is a hydrogen atom or a monovalent organic group, and
l, m, n, p, q, and r are each independently an integer of 0 to 1,000.

Examples of the divalent linking group represented by L include an alkylene group, a cycloalkylene group, an arylene group, an ester group, an ether group, and a group in which two or more thereof are linked. L is preferably an alkylene group, more preferably an alkylene group having 1 to 10 carbon atoms, and still more preferably an alkylene group having 1 to 6 carbon atoms.

The alkylene group may be linear or branched, and is preferably linear.

$R^a$ is preferably a monovalent organic group. Specific examples of the monovalent organic group represented by $R^a$ include an alkyl group, a cycloalkyl group, an alkoxy group, an aryl group, an aralkyl group, an alkylcarbonyl group, an alkoxycarbonyl group, and an alkylcarbonyloxy group. Above all, $R^a$ is preferably an alkyl group or an aryl group, more preferably a methyl group or a phenyl group, and still more preferably a methyl group.

$R^2$ is preferably a monovalent organic group. Specific examples of the monovalent organic group represented by $R^2$ and preferred examples thereof are the same as for $R^a$.

$R^3$ is preferably a monovalent organic group. Specific examples of the monovalent organic group represented by $R^3$ and preferred examples thereof are the same as for $R^a$.

l, m, n, p, q, and r are each independently preferably 1 to 1,000 and more preferably 6 to 300.

In a case where the resin (B) contains the structural unit (b-1), the content thereof is preferably 1% to 30% by mass, more preferably 2% to 25% by mass, and still more preferably 3% to 20% by mass with respect to the total resin (B).

Structural Unit (b-2-1)

The resin (B) preferably contains a (meth)acrylate structural unit having a hydroxy group in the side chain thereof (also referred to as a structural unit (b-2-1)). The resin (B)

may contain only one type of structural unit corresponding to the structural unit (b-2-1), or may contain two or more types of structural units corresponding to the structural unit (b-2-1).

The structural unit (b-2-1) may be, for example, a structural unit derived from hydroxyalkyl (meth) acrylate such as 2-hydroxyethyl (meth)acrylate, hydroxypropyl (meth)acrylate, or hydroxybutyl (meth) acrylate.

The content of the structural unit (b-2-1) is preferably 0% to 50% by mass, more preferably 0% to 30% by mass, and still more preferably 0% to 25% by mass with respect to the total resin (B).

Structural Unit (b-2-2)

The resin (B) preferably contains a (meth)acrylate structural unit having at least any partial structure selected from the group consisting of polycaprolactone, polycaprolactam, polycarbonate, polyester, and polyether in the side chain thereof (also referred to as a structural unit (b-2-2)).

The structural unit (b-2-2) may be preferably, for example, a structural unit derived from a monomer represented by General Formula $CH_2=CR—COO—R'$ (where R is a hydrogen atom or a methyl group, and R' is a group containing at least any partial structure selected from the group consisting of polycaprolactone, polycaprolactam, polycarbonate, polyester, and polyether).

In a case where the resin (B) contains this structural unit, it may contain only one type or two or more types.

Specific examples of the monomer corresponding to the structural unit (b-2-2) include "PLACCEL F" series, the trade name of Daicel Corporation, and methoxypolyethylene glycol mono (meth) acrylate, polypropylene glycol mono (meth) acrylate and 2-(2-ethoxyethoxy)ethyl acrylate each having an ethylene oxide addition mole number of 3 to 20.

The structural unit (b-2-2) preferably contains a hydroxy group in the side chain thereof. For example, the structural unit (b-2-2) is preferably derived from a monomer in which the terminal of R' in the above-mentioned general formula is a hydroxy group.

Here, in a case where a structural unit corresponds to both the structural unit (b-2-1) and the structural unit (b-2-2), the structural unit is regarded as corresponding to the structural unit (b-2-2).

As an example, the content of the structural unit (b-2-2) is preferably 0% to 70% by mass, more preferably 0% to 65% by mass, and still more preferably 0% to 60% by mass with respect to the total resin (B).

In particular, from the viewpoint of further improving scratch resistance and/or scratch-healing properties, the content of the structural unit (b-2-2) is preferably 5% to 70% by mass, more preferably 5% to 65% by mass, and still more preferably 5% to 60% by mass with respect to the total resin (B).

From the viewpoint of adjusting the hydroxyl value, the resin (B) preferably contains one or two or more structural units selected from the group consisting of structural units (b-2-1) and structural units (b-2-2).

Specifically, the total amount of the structural unit (b-2-1) and the structural unit (b-2-2) is preferably 2% to 70% by mass, more preferably 6% to 65% by mass, and still more preferably 8% to 60% by mass with respect to the total resin (B).

The resin (B) may contain structural units other than the above-mentioned structural units, from the viewpoint of adjusting the hydroxyl value, adjusting the flexibility and the glass transition temperature, and the like.

Structural Unit (b-3)

For example, the resin (B) may contain a structural unit derived from a monomer represented by General Formula $CH_2=CR—COO—R''$ (where R is a hydrogen atom or a methyl group, and R'' is an alkyl group, a monocyclic or polycyclic cycloalkyl group, an aryl group, or an aralkyl group) (hereinafter, also referred to as a structural unit (b-3)). In a case where the resin (B) contains this structural unit, it may contain only one type or two or more types.

Specific examples of the above monomer include methyl (meth)acrylate, ethyl (meth)acrylate, n-butyl (meth)acrylate, isobutyl (meth)acrylate, tert-butyl (meth)acrylate, 2-ethylhexyl (meth)acrylate, isodecyl (meth)acrylate, n-lauryl (meth)acrylate, n-stearyl (meth)acrylate, phenyl (meth)acrylate, and benzyl (meth)acrylate. Above all, R'' is preferably an alkyl group having 1 to 8 carbon atoms, more preferably an alkyl group having 1 to 6 carbon atoms, and still more preferably an alkyl group having 1 to 4 carbon atoms.

The content of the structural unit (b-3) is preferably 0% to 90% by mass, more preferably 10% to 85% by mass, and still more preferably 20 to 80% by mass with respect to the total resin (B).

The resin (B) may contain a structural unit derived from a monomer that is not a (meth)acrylic monomer and is copolymerizable with the (meth)acrylic monomer. For example, the resin (B) may contain a structural unit derived from a styrene-based monomer such as styrene or α-methylstyrene, a vinyl-based monomer such as vinyl acetate or vinyl propionate, an unsaturated carboxylic acid monomer such as itaconic acid, maleic acid or fumaric acid, or the like.

However, from the viewpoint of flexibility of the resin (B), compatibility with other components, solvent solubility, and the like, the amount of the structural unit derived from a monomer other than the (meth)acrylic monomer in the resin (B) is preferably equal to or less than 50% by mass, more preferably equal to or less than 20% by mass, still more preferably equal to or less than 10% by mass, and particularly preferably 0% with respect to the total resin (B).

The hydroxyl value of the resin (B) is preferably 10 to 200 mgKOH/g, more preferably 30 to 150 mgKOH/g, and still more preferably 40 to 120 mgKOH/g. It is assumed that, in a case where the hydroxyl value of the resin (B) is set within this numerical range, the resin (B) and the polyfunctional isocyanate (C) react appropriately, which makes it easier to form the above-mentioned "film containing a portion having a low cross-linking density and a portion having a high cross-linking density", and as a result, the stretchability and scratch resistance can be further improved.

The number average molecular weight Mn of the resin (B) is not particularly limited. The Mn is preferably 1,000 to 50,000, more preferably 2,000 to 30,000, and still more preferably 3,000 to 20,000. In addition, the weight average molecular weight Mw of the (meth)acrylic resin (B) is not particularly limited. The Mw is preferably 2,000 to 100,000, more preferably 4,000 to 60,000, and still more preferably 6,000 to 40,000.

The number average molecular weight Mn or the weight average molecular weight Mw can be measured as a value in terms of standard polystyrene by a gel permeation chromatography (GPC) method.

The glass transition temperature of the resin (B) is preferably −20° C. to 100° C. and more preferably −5° C. to 80° C. In a case where the glass transition temperature of the resin (B) is set within this range, the stretchability and scratch resistance of a cured film obtained by curing a composition can be further improved.

The glass transition temperature of the resin (B) can be determined by various methods, and for example, it can be determined based on the following equation (known as Fox's equation).

$$1/Tg=(W_1/Tg_1)+(W_2/Tg_2)+(W_3/Tg_3)+\ldots+(W_n/Tg_n)$$

In the equation, Tg represent a glass transition temperature (K) of the resin, $W_1$, $W_2$, $W_3$ ... $W_n$ represent mass fractions of the respective monomers, and $Tg_1$, $Tg_2$, $Tg_3$ ... $Tg_n$ represent glass transition temperatures (K) of homopolymers consisting of monomers corresponding to the mass fractions of the respective monomers.

In addition, regarding a monomer whose glass transition temperature is unknown, such as a special monomer or a polyfunctional monomer, the glass transition temperature thereof is obtained by using only the monomer whose glass transition temperature is known.

The (meth)acrylic resin (B) may be used alone or in combination of two or more thereof.

The content of the (meth)acrylic resin (B) in the composition is preferably 0.5% to 50% by mass, more preferably 1% to 40% by mass, still more preferably 2% to 35% by mass, and particularly preferably 3% to 30% by mass with respect to the total non-volatile components in the composition.

Polyfunctional Isocyanate (C)

The film-forming resin composition of the present embodiment includes a polyfunctional isocyanate (C).

The polyfunctional isocyanate (C) is preferably di- to hexafunctional (that is, having 2 to 6 reactive isocyanate groups per molecule), and more preferably di- to tetrafunctional. It is assumed that appropriately selecting the number of functional groups in the polyfunctional isocyanate (C) and the percentage of the functional group to the molecular weight (mass) of the polyfunctional isocyanate (C) makes it easier to form the above-mentioned "film containing a portion having a low cross-linking density and a portion having a high cross-linking density". As a result, it is assumed that the stretchability and scratch resistance can be further improved.

Examples of the polyfunctional isocyanate (C) include aliphatic diisocyanates such as lysine diisocyanate, hexamethylene diisocyanate and trimethylhexane diisocyanate; cyclic aliphatic diisocyanates such as hydrogenated xylylene diisocyanate, isophorone diisocyanate, methylcyclohexane-2,4- (or 2,6)-diisocyanate, 4,4'-methylenebis (cyclohexylisocyanate) and 1,3-(isocyanatomethyl)cyclohexane; and tri- or higher functional isocyanates such as lysine triisocyanate. An isocyanurate and a biuret type adduct, which are multimers of an isocyanate compound, and further a compound obtained by adding an isocyanate compound to a polyhydric alcohol or a low molecular weight polyester resin can also be used as the isocyanate compound.

As to the polyfunctional isocyanate (C), a biuret type isocyanate, an isocyanurate type isocyanate, an adduct type isocyanate, an allophanate type isocyanate, and the like are known. In the present embodiment, any of such types of polyfunctional isocyanates can be used, but it is preferable to use an isocyanurate type isocyanate compound, that is, a polyfunctional isocyanate having a cyclic skeleton of isocyanuric acid.

The polyfunctional isocyanate (C) may be a so-called blocked isocyanate. In other words, a part or all of the isocyanate groups in the polyfunctional isocyanate (C) may be in the form of blocked isocyanate groups, which are blocked by a protecting group. For example, an isocyanate group is blocked by an active hydrogen compound such as an alcohol-based active hydrogen compound, a phenol-based active hydrogen compound, a lactam-based active hydrogen compound, an oxime-based active hydrogen compound, or an active methylene-based active hydrogen compound to form a blocked isocyanate group.

The amount of the isocyanate groups contained in the polyfunctional isocyanate (C) can be expressed by the percentage of the mass of isocyanate groups (—NCO) to the total polyfunctional isocyanate (C). The mass percentage of isocyanate groups (NCO %) to the total polyfunctional isocyanate (C) is preferably 5% to 50%, more preferably 5% to 30%, and still more preferably 10% to 25%.

Examples of commercially available products of polyfunctional isocyanate (C) include DURANATE (trade name) series manufactured by Asahi Kasei Corporation, TAKENATE (trade name) series manufactured by Mitsui Chemicals, Inc., and DEATH MODULE (trade name) series manufactured by Sumika Bayer Urethane Co., Ltd.

The polyfunctional isocyanate (C) may be used alone or in combination of two or more thereof.

The content of the polyfunctional isocyanate (C) in the composition is preferably 5% to 55% by mass, more preferably 10% to 50% by mass, and still more preferably 15% to 45% by mass with respect to the total non-volatile components in the composition.

Polysiloxane Compound (D) Having Hydroxy Group (Compound (D))

The film-forming resin composition of the present embodiment preferably includes a polysiloxane compound (D) having a hydroxy group (hereinafter, also simply referred to as "compound (D)") as a component other than the resin (A), the resin (B), the polyfunctional isocyanate (C), and the like. Effects such as improvement of contamination resistance can be obtained by using the compound (D).

In addition, since the compound (D) has a hydroxy group, it can react with the polyfunctional isocyanate (C), which can suppress so-called bleed-out.

Here, the polysiloxane structure contained in the compound (D) is preferably, for example, a polydimethylsiloxane structure (—Si(CH$_3$)$_2$—O—) or a polydiphenylsiloxane structure (—Si(C$_6$H$_5$)$_2$—O—). That is, the compound (D) is preferably a compound having a polydimethylsiloxane structure and/or a polydiphenylsiloxane structure and a hydroxy group.

The compound (D) preferably contains a polydimethylsiloxane structure.

Examples of the compound (D) include α,ω-dihydroxypolydimethylsiloxane and α,ω-dihydroxypolydiphenylsiloxane, each of which has at least one terminal hydroxyl group in the molecule.

In addition, a known silicone-based surface conditioner having a hydroxy group may be used as the compound (D). Examples thereof include "BYK-370" and "BYK-375" manufactured by BYK Japan K.K.

In a case where the compound (D) is used, the compound (D) may be used alone or in combination of two or more thereof.

In a case where the composition includes the compound (D), the content thereof is preferably 0.1% to 10% by mass, more preferably 0.25% to 5% by mass, and still more preferably 0.5% to 3% by mass with respect to the total non-volatile components in the composition.

Polyol (E)

The film-forming resin composition of the present embodiment may include a polyol (E) (here, the polyol (E) means a polyol which does not correspond to the resin (A) or the resin (B)). It is assumed that the inclusion of the polyol (E) in the composition further increases the cross-linking density of the cured film by the reaction with the polyfunctional isocyanate (C). It is assumed that this makes it difficult for dirt to enter the inside of the cured film, thus resulting in improved contamination resistance. That is, it is preferable to use the polyol (E) from the viewpoint of improving the contamination resistance.

From the viewpoint of increasing the cross-linking density, the polyol (E) is preferably triol or tetraol and more preferably tetraol.

The polyol (E) that can be used herein is not particularly limited. For example, the polyol described as the raw material (monomer) of the resin (A), specifically, polycaprolactone polyol, polycaprolactam polyol, polycarbonate polyol, polyester polyol, polyether polyol, or the like can be used. It is assumed that these polyols are preferable in that, due to having a flexible molecular skeleton, the workability (the stretchability of the film) can be easily maintained while the cross-linking density is increased, and the benefit of scratch-healing properties can be expected.

In particular, the polyol (E) is preferably polycaprolactone polyol, among which polycaprolactone tetraol is preferable. For example, those having trade names such as PLACCEL 200 series, PLACCEL 300 series, and PLACCEL 400 series manufactured by Daicel Corporation can be used as the polycaprolactone polyol.

In a case where the polyol (E) is used, the polyol (E) may be used alone or in combination of two or more thereof.

In a case where the composition includes the polyol (E), the content thereof is preferably 1% to 80% by mass, more preferably 5% to 70% by mass, and still more preferably 10% to 60% by mass with respect to the total non-volatile components in the composition.

Other Components

The film-forming resin composition of the present embodiment may include various optional components other than the above-mentioned components. For example, a photoinitiator, a curing accelerator (curing catalyst or the like), a surfactant, a leveling agent, an ultraviolet absorber, a light stabilizer, and a component for improving the designability (a pigment or a matting agent) may be included in the film-forming resin composition of the present embodiment.

Solvent

The film-forming resin composition of the present embodiment is typically used in a state where the above-mentioned components are dissolved or dispersed in a solvent.

In one aspect, the solvent includes an organic solvent. Examples of the organic solvent include aromatic hydrocarbon-based solvents such as toluene and xylene; alcohol-based solvents such as methanol, ethanol, isopropyl alcohol, n-butanol, isobutanol, tert-butanol (2-methyl-2-propanol), tert-amyl alcohol, and diacetone alcohol; ketone-based solvents such as acetone, methyl ethyl ketone, methyl isobutyl ketone, and cyclohexanone; and ester-based solvents such as ethyl acetate, propyl acetate, butyl acetate, and isobutyl acetate.

In another aspect, a part or all of the solvent may be water. For example, in a case where a water-soluble or water-dispersible resin (emulsion type resin or the like) is used as the resin (A) and/or the resin (B), a part or all of the solvent is preferably water.

However, in a case of forming a film using the film-forming resin composition of the present embodiment, most or all of the solvent is preferably an organic solvent from the viewpoint of good productivity (drying speed). In other words, the amount of water with respect to the total solvent is preferably equal to or less than 10% by mass, more preferably equal to or less than 1% by mass, and still more preferably equal to or less than 0.5% by mass. Particularly preferably, the film-forming resin composition of the present embodiment does not substantially include water (excluding water that is inevitably included due to the production process or aging).

In a case where a solvent is used, the amount thereof used is not particularly limited, but the solvent can be used in such an amount that the solid content (non-volatile component) concentration of the composition is, for example, 5% to 99% by mass, preferably 10% to 70% by mass.

Regarding Quantitative Relationship of Each Component

In a case of preparing the film-forming resin composition of the present embodiment, it is preferable to set a quantitative ratio (also referred to as "equivalent weight") of hydroxy groups and isocyanate groups in the composition to an appropriate value. This makes it easier to obtain desired cross-linking density and cured physical properties.

Specifically, in the total solid content (non-volatile component) of the composition, the equivalent ratio (NCO/OH) of isocyanate groups in the polyfunctional isocyanate (C) to hydroxy groups (specifically, hydroxy groups contained in the resin (A), the resin (B), the polysiloxane compound (D) having a hydroxy group, and the polyol (E)) is preferably 0.5 to 1.5 and more preferably 0.8 to 1.2.

It should be noted that the equivalent ratio is a ratio of the number of functional groups (ratio of the number of moles of functional groups).

The equivalent ratio (NCO/OH) can be calculated from the hydroxyl value and amount used of each component such as resin (A), resin (B), polysiloxane compound (D) having a hydroxy group, and polyol (E), and the NCO % (as defined above) and the amount used of the polyfunctional isocyanate (C).

As another point of view, by adjusting the amount of hydroxy groups (specifically, the hydroxyl value) of the non-volatile components in the composition other than the polyfunctional isocyanate (C), the cross-linking structure can be controlled, and therefore the film can be more easily stretched or the contamination resistance can be further enhanced in a case of being formed into a cured film.

For example, from the viewpoint of stretchability, the hydroxyl value as a whole of non-volatile components in the composition other than the polyfunctional isocyanate (C) is preferably 40 to 80 mgKOH/g, more preferably 50 to 80 mgKOH/g, and still more preferably 50 to 70 mgKOH/g.

In addition, from the viewpoint of contamination resistance, the hydroxyl value as a whole of non-volatile components in the composition other than the polyfunctional isocyanate (C) is preferably 80 to 300 mgKOH/g and more preferably 85 to 250 mgKOH/g.

Regarding Supply Form

The film-forming resin composition of the present embodiment may be a so-called one-part type or two-part type.

Specifically, the film-forming resin composition of the present embodiment can be supplied as a one-part type composition in which the resin (A), the resin (B), and the polyfunctional isocyanate (C) are all uniformly mixed or dispersed.

In addition, the film-forming resin composition of the present embodiment may be supplied as a two-part type (two-part kit) of a liquid A containing the resin (A) and the resin (B) and a liquid B containing the polyfunctional isocyanate (C). In this case, the mixing ratio of the liquid A and the liquid B is preferably specified such that the cross-linking density n of the cured film obtained by mixing the liquid A and the liquid B and curing the mixture under predetermined conditions is $1.0 \times 10^{-4}$ to $5.0 \times 10^{-3}$ mol/cm$^3$.

Regarding Physical Properties

The glass transition temperature obtained by viscoelasticity measurement at a frequency of 1.0 Hz and a temperature range of −40° C. to 160° C. of a cured film obtained by curing the film-forming resin composition of the present embodiment at 80° C. for 16 hours is preferably −20° C. to 60° C., more preferably −10° C. to 50° C., and still more preferably 10° C. to 40° C.

In addition, the loss tangent (tan δ) of the cured film at this glass transition temperature is preferably equal to or more than 0.5, more preferably 0.5 to 2.5, and still more preferably 0.5 to 2.0. It is assumed that, by designing the composition such that the tan δ becomes large to some extent, that is, the contribution of viscosity to the viscoelastic behavior becomes large to some extent, the film can be made more stretchable in a case where the composition is formed into a film.

In the present embodiment, the cross-linking density n calculated by Mathematical Formula (1) may be $1.0 \times 10^{-4}$ to $5.0 \times 10^{-3}$ mol/cm$^3$, but is more preferably $1.0 \times 10^{-4}$ to $3.0 \times 10^{-3}$ mol/cm$^3$ and still more preferably $1.0 \times 10^{-4}$ to $2.0 \times 10^{-3}$ mol/cm$^3$. Appropriate adjustment of the cross-linking density n can further enhance the stretchability and scratch resistance.

Applications, Usage, and the Like

The film-forming resin composition of the present embodiment can be used, for example, as a material for forming a protective layer of a laminated film which will be described later. Of course, the film-forming resin composition of the present embodiment may be directly applied to an article that an organic polymer is exposed (for example, an article coated with a coating material containing an organic polymer), dried, and cured to form a film.

Laminated Film

The laminated film of the present embodiment is a laminated film for protecting the surface of the article that an organic polymer is exposed. Then, the laminated film of the present embodiment includes a base material layer and a protective layer. In addition, the protective layer has a cross-linking density n of $1.0 \times 10^{-4}$ to $5.0 \times 10^{-3}$ mol/cm$^3$, which is determined from a minimum value E'$_{min}$ of storage elastic modulus of the protective layer in a case where the protective layer is subjected to viscoelasticity measurement at a frequency of 1.0 Hz and a temperature range of −40° C. to 160° C., an absolute temperature T at the E'$_{min}$, and a gas constant R, according to Mathematical Formula (1).

$$n = E'_{min}/(3RT)  \quad \text{Mathematical Formula (1)}$$

Here, the "surface of the article that an organic polymer is exposed" means, for example, a surface of a coating film, a surface of a plastic molded article, or a surface with a thin layer of an organic polymer coated on a surface of an inorganic material. Specifically, the surface of the article can be protected from scratches and contamination by attaching the laminated film of the present embodiment onto the painted surface of a vehicle body, the surface of a mobile phone or a smartphone, or the like.

The protective layer of this laminated film can be typically provided according to the section of <Film-forming resin composition>. That is, a laminated film having two layers of a base material layer and a protective layer can be obtained by applying the above-mentioned film-forming resin composition (containing a solvent) onto the surface of a suitable base material (film), drying the solvent, and then heat-curing the applied film-forming resin composition.

The coating method is not particularly limited. The coating can be carried out using a known coating device such as a bar coater, a spray coater, an air knife coater, a kiss roll coater, a metering bar coater, a gravure roll coater, a reverse roll coater, a dip coater, or a die coater.

The drying method is also not particularly limited. For example, a known film coating drying technique can be appropriately applied.

The temperature and time for heat-curing may be appropriately set within the range where the base material layer is not deformed. The heat-curing temperature is, for example, 40° C. to 120° C., and the heat-curing time is, for example, 10 minutes to 24 hours. Examples of the heat-curing method include a method using hot air and a method using a drying oven (dryer) of a known coating machine.

The thickness of the protective layer is not particularly limited. The thickness is preferably 5 to 200 μm and more preferably 10 to 150 μm. It is assumed that appropriate adjustment of the protective layer thickness makes it possible to achieve both higher stretchability at the time of attachment and higher scratch resistance.

The glass transition temperature obtained in a case where the viscoelasticity of the protective layer is measured at a frequency of 1.0 Hz and a temperature range of −40 to 160° C. is preferably −20 to 60° C., more preferably −10 to 50° C., and still more preferably 10 to 40° C. In addition, the loss tangent (tan δ) of the protective layer at this glass transition temperature is preferably equal to or more than 0.5, more preferably 0.5 to 2.5, and still more preferably 0.5 to 2.0. It is assumed that the stretchability of the protective layer can be further enhanced by designing the protective layer such that the tan δ of the protective layer becomes large to some extent, that is, the contribution of viscosity to the viscoelastic behavior becomes large to some extent.

In the present embodiment, the cross-linking density n calculated by Mathematical Formula (1) may be $1.0 \times 10^{-4}$ to $5.0 \times 10^{-3}$ mol/cm$^3$, but is more preferably $1.0 \times 10^{-4}$ to $3.0 \times 10^{-3}$ mol/cm$^3$ and still more preferably $1.0 \times 10^{-4}$ to $2.0 \times 10^{-3}$ mol/cm³. Appropriate adjustment of the cross-linking density n can further enhance the stretchability and scratch resistance.

The material of the base material layer is not particularly limited, and can be appropriately selected from the viewpoint of workability (stretchability) and durability. Examples of the material of the base material layer include thermoplastic resins such as polyester, polyurethane, polyvinyl chloride, triacetyl cellulose, polyacrylic resin, polycarbonate, and thermoplastic polyimide. In particular, thermoplastic polyurethane is preferable from the viewpoint of workability (stretchability).

The base material layer is typically substantially transparent, but may be colored from the viewpoint of designability and the like.

The thickness of the base material layer is preferably 30 to 250 μm and more preferably 50 to 200 μm. It is assumed that appropriate adjustment of the base material thickness makes it possible to achieve both higher stretchability at the time of attachment and higher scratch resistance.

The laminated film is constituted of at least two layers of a base material layer and a protective layer, but may be provided with a layer other than these two layers. For example, there may be a layer for enhancing the adhesion or adhesiveness of the laminated film to an article, a layer for protecting the laminated film itself before the laminated film is attached to an article, or the like.

As described at the beginning of the present specification, the laminated film of the present embodiment, for example, as a paint protection film, can be attached to the painted surface of the vehicle body to obtain effects such as prevention of scratches and prevention of contamination. In addition, effects such as prevention of scratches and prevention of contamination can be similarly obtained even in a case where the laminated film of the present embodiment is attached to the surface of a mobile phone or a smartphone.

More specifically, in a case of being attached to the vehicle body, with the base material layer side of the laminated film facing the side of the painted surface of the vehicle body, the laminated film is attached to the painted surface without any gap while deforming (stretching) according to the curved surface of the painted surface of the vehicle body, which thus makes it possible to protect the painting of the vehicle body from external force and contamination. At this time, since the protective film of the laminated film of the present embodiment has a good "stretchability" and is therefore less likely to be broken, the laminated film can be attached neatly according to the curved surface of the vehicle body.

Although the embodiments of the present invention have been described above, these are only examples of the present invention, and various configurations other than the above-mentioned embodiments can be adopted. In addition, the present invention is not limited to the above-mentioned embodiments, and includes modifications and improvements as long as the object of the present invention can be achieved.

EXAMPLES

Embodiments of the present invention will be described in detail with reference to Examples and Comparative Examples. The present invention is not limited to the Examples.

Synthesis of Polyurethane Resin

A four-necked flask equipped with a thermometer, a thermostat, a stirrer, and a reflux condenser was prepared. The following components were charged into the flask which was then stirred. At this time, the molar ratio of the following diol compound (1) and the following diisocyanate compound (2) (diol/diisocyanate) was 1.6.

(1) 78 g of a polycarbonate diol obtained by using 1,6-hexanediol as a raw material (ETERNACOLL (registered trademark) UH-50, hydroxyl value: 224 mg KOH/g, molecular weight: 500, available from Ube Industries, Ltd.)

(2) 22 g of isophorone diisocyanate (NCO %: 38%)

(3) 10 g of ethyl acetate (4) 0.01 g of dibutyltin dilaurate

The internal temperature of the flask was raised to 75° C. with stirring, and then the temperature was maintained at the same temperature for 8 hours with stirring. Then, the spectrum was measured by an infrared absorption spectrum device (FT-IR Spectrum100, manufactured by Perkin Elmer, Inc.), and it was confirmed that the isocyanate group was completely consumed. After this confirmation, the flask was cooled to terminate the reaction.

The reaction solution in the flask was diluted with ethyl acetate to obtain a polyurethane composition containing a polyurethane polyol (A-1) (solid content percentage: 80% by mass).

The obtained polyurethane polyol (A-1) had a hydroxyl value of 64 mgKOH/g, a number average molecular weight of 2,500, and a weight average molecular weight of 5,000.

Polyurethane resins (A-2) to (A-11) were also synthesized by a method similar to that of the resin (A-1).

Table 1 and Table 2 show the raw materials of the polyurethane resins (A-1) to (A-11) and the amounts of the raw materials charged, as well as the obtained hydroxyl value, number average molecular weight, and weight average molecular weight.

In addition, the numerical values of a-1 and a-2 and the numerical values of the formulation amounts in the column of raw materials in Table 1 and Table 2 are amounts in terms of solid content (unit:gram).

TABLE 1

| | Resin No. | | A-1 | A-2 | A-3 | A-4 |
|---|---|---|---|---|---|---|
| Raw materials | a-1 | ETERNACOLL UH-50 | 78 | | | |
| | | KURARAY POLYOL P-510 | | 78 | 23 | |
| | | KURARAY POLYOL P-520 | | | 55 | 78 |
| | a-2 | IPDI | 22 | 22 | 22 | 22 |
| | | Formulation amount | 100 | 100 | 100 | 100 |
| | | Molar ratio (a-1)/(a-2) | 1.6 | 1.6 | 1.6 | 1.6 |
| Properties of polyurethane resin (A) | | Hydroxyl value (mgKOH/g) | 64 | 64 | 64 | 64 |
| | | Number average molecular weight | 2500 | 2200 | 2300 | 2400 |
| | | Weight average molecular weight | 5000 | 4500 | 4700 | 4800 |

TABLE 2

| | Resin No. | A-5 | A-6 | A-7 | A-8 | A-9 | A-10 | A-11 |
|---|---|---|---|---|---|---|---|---|
| Raw materials | a-1 ETERNACOLL UH-50 | 82 | 67 | 82 | 81 | 80 | 76 | 76 |
| | a-2 HDI | 18 | | | | | | |
| | D-178NL | | 33 | | | | | |
| | TDI | | | 18 | | | | |
| | XDI | | | | 19 | | | |
| | H6XDI | | | | | 20 | | |
| | MDI | | | | | | 24 | |
| | H12MDI | | | | | | | 24 |
| | Formulation amount | 100 | 100 | 100 | 100 | 100 | 100 | 100 |
| | Molar ratio (a-1)/(a-2) | 1.6 | 1.8 | 1.6 | 1.6 | 1.6 | 1.6 | 1.6 |
| Properties of polyurethane resin (A) | Hydroxyl value (mgKOH/g) | 64 | 66 | 68 | 68 | 64 | 63 | 68 |
| | Number average molecular weight | 2300 | 2500 | 2400 | 2400 | 2400 | 2500 | 2600 |
| | Weight average molecular weight | 4700 | 5000 | 4800 | 4800 | 5000 | 5000 | 5200 |

Details of the raw materials shown in Table 1 and Table 2 are as follows.

ETERNACOLL (registered trademark) UH-50: polycarbonate diol (1,6-hexanediol skeleton, molecular weight: 500, hydroxyl value: 224 mgKOH/g), manufactured by Ube Industries, Ltd.)

KURARAY POLYOL P-510: polyester diol (methylpentanediol, adipic acid skeleton, molecular weight: 500, hydroxyl value: 224 mgKOH/g), manufactured by Kuraray Co., Ltd.)

KURARAY POLYOL P-520: polyester diol (methylpentanediol, terephthalic acid skeleton, molecular weight: 500, hydroxyl value: 224 mgKOH/g), manufactured by Kuraray Co., Ltd.)

TABLE 3

| Abbreviation | General name, product name, or the like | Molecular Weight | NCO % |
|---|---|---|---|
| HDI | Hexamethylene diisocyanate | 168 | 50.0 |
| IPDI | Isophorone diisocyanate | 222 | 37.8 |
| TDI | Tolylene diisocyanate | 174 | 48.2 |
| XDI | Xylylene diisocyanate | 188 | 44.7 |
| H6XDI | Hydrogenated xylylene diisocyanate | 194 | 43.3 |
| MDI | Diphenylmethane diisocyanate | 250 | 33.6 |
| H12MDI | Hydrogenated diphenylmethane diisocyanate | 262 | 32.5 |
| D-178NL | Allophanate of hexamethylene diisocyanate (HDI), difunctional Product name: TAKENATE D-178NL (Mitsui Chemicals, Inc.) | (Unknown) | 19.2 |

Synthesis of (Meth)Acrylic Resin Having Hydroxy Group

A four-necked flask equipped with a thermometer, a thermostat, a stirrer, a reflux condenser, and a dropping device was prepared. 100 parts by mass of methyl isobutyl ketone was charged into the flask and heated to 110° C. with stirring.

Then, the following components were uniformly mixed to obtain a mixture which was then continuously added dropwise to the flask over 2 hours from a dropping funnel.

(1) 5 parts by mass of SILAPLANE FM-0721 (manufactured by JNC Corporation)
(2) 23 parts by mass of 2-hydroxyethyl methacrylate
(3) 48 parts by mass of methyl methacrylate
(4) 23 parts by mass of n-butyl methacrylate
(5) 1 part by mass of methacrylic acid
(6) 2 parts by mass of 1,1'-azobis-1-cyclohexanecarbonitrile (V-40, manufactured by Wako Pure Chemical Industries, Ltd.)

After completion of dropwise addition, the mixture was further stirred at 110° C. for 4 hours to react the residual monomers. Then, the heating was stopped and the temperature was cooled to room temperature to obtain a resin composition (solid content percentage: 50% by mass) containing a (meth)acrylic resin (B-1).

The obtained (meth)acrylic resin (B-1) had a number average molecular weight of 6,000 and a weight average molecular weight of 24,000. In addition, the (meth)acrylic resin (B-1) had a glass transition temperature of 69° C., which was theoretically calculated from the formulation ratios of the monomers used, based on the Fox's equation. Furthermore, the (meth)acrylic resin (B-1) had a hydroxyl value of 99 mgKOH/g.

The number average molecular weight and the weight average molecular weight were measured and calculated by gel permeation chromatography (GPC). The equipment and conditions used are as follows.

Device used: HLC8220GPC (manufactured by Tosoh Corporation)
Columns used: TSKgel SuperHZM-M, TSKgel GMHXL-H, TSKgel G2500HXL, TSKgel G5000HXL (all manufactured by Tosoh Corporation)
Column temperature: 40° C.
Standard material: TSKgel standard polystyrene A1000, A2500, A5000, F1, F2, F4, F10 (all manufactured by Tosoh Corporation)
Detector: RI (differential refraction) detector
Eluent: tetrahydrofuran
Flow rate: 1 ml/min (Meth)acrylic resins (B-2) to (B-4) were also synthesized by a method similar to that of the resin (B-1).

Table 4 shows the raw materials of the (meth)acrylic resins (B-1) to (B-4) and the amounts of the raw materials charged, as well as the hydroxyl value, number average molecular weight, and weight average molecular weight.

In addition, the numerical values of b-1, b-2, and b-3 and the numerical values of the formulation amounts in the column of raw materials in Table 4 are amounts in terms of solid content (unit: gram).

TABLE 4

|  |  |  | Resin No. | | | |
| --- | --- | --- | --- | --- | --- | --- |
|  |  |  | B-1 | B-2 | B-3 | B-4 (Comparative resin) |
| Raw materials | b-1 | FM-0721 | 5 | 5 | Not contained | 5 |
|  | b-2 | 2-HEMA | 23 | 5 | 5 | Not contained |
|  |  | FA5 |  | 50 | 50 |  |
|  | b-3 | MMA | 48 | 39 | 44 | 45 |
|  |  | BMA | 23 |  |  | 50 |
|  |  | MAA | 1 | 1 | 1 |  |
| Properties of (meth)acrylic resin (B) | | Glass transition temperature (° C.) according to Fox's equation | 69 | 0 | 4 | 56 |
|  |  | Number average molecular weight Mn | 6,000 | 5800 | 5500 | 6100 |
|  |  | Weight average molecular weight Mw | 24,000 | 22000 | 21000 | 26000 |
|  |  | Hydroxyl value (mgKOH/g) | 99 | 62 | 62 | 0 |

Abbreviations of raw materials in Table 4 represent the following.

FM-0721: SILAPLANE FM-0721 (molecular weight: 5000), polydimethylsiloxane modified with methacrylate at single terminal, manufactured by JNC Corporation)

2-HEMA: 2-hydroxyethyl methacrylate

FA5: PLACCEL FA5 (caprolactone 5 mol adduct, molecular weight: 689, hydroxyl value: 74 to 84 mgKOH/g), polycaprolactone-modified hydroxyethyl acrylate, manufactured by Daicel Corporation)

MMA: methyl methacrylate

BMA: n-butyl methacrylate

MAA: methacrylic acid

Preparation of Film-Forming Resin Composition

The synthesized polyurethane resin and the synthesized (meth)acrylic resin were mixed in the types and formulation amounts (which are amounts in terms of solid content) shown in Tables 5 to 9 which will be given later to obtain a precursor of the composition.

Polyfunctional isocyanate (and polysiloxane and polyol for some compositions) shown in Tables 5 to 9 were added to the precursor in the formulation amounts described. Then, the solid content concentration was adjusted with butyl acetate to obtain a film-forming resin composition having a solid content concentration of 50% by mass.

The composition of each component of the film-forming resin composition and other information (such as a hydroxyl value) are collectively shown in Tables 5 to 9 which will be given later.

Production of Cured Film for Viscoelasticity Measurement

The film-forming resin composition prepared above was applied onto the surface of a polypropylene plate (length 10 mm×width 10 mm×thickness 2 mm, made in accordance with JIS K 6921) with a 10 mil applicator, followed by allowing to stand at room temperature for 10 minutes. Then, curing was carried out with a warm air dryer at 80° C. for 16 hours. This was followed by allowing to cool at room temperature for another 1 hour.

As described above, a cured film having a film thickness of 60 μm for measuring viscoelasticity was obtained.

Measurement of Viscoelasticity and Calculation of Various Physical Properties The cured film having a thickness of 60 μm obtained above was peeled from the polypropylene plate to obtain a test piece having a width of 5 mm and a length of 50 mm. Using this test piece, dynamic viscoelasticity measurement (measurement of storage elastic modulus (E'), loss elastic modulus (E''), and loss tangent (tan δ)) was carried out under the following conditions.

Device: dynami viscoelasticity measuring device RSA3 (manufactured by TA Instruments, Inc)

Measurement mode: non-resonance forced vibration method

Rate of temperature increase: 5.0° C./min

Measurement interval: 12/min

Frequency: 1.0 Hz

Temperature range: −40° C. to 160° C.

The temperature at the peak top of the loss tangent (tan δ) in this measurement was taken as the glass transition temperature of the cured film. In addition, the cross-linking density n was calculated from a minimum value $E'_{min}$ of storage elastic modulus, an absolute temperature T at the $E'_{min}$, and a gas constant R, according to Mathematical Formula (1).

For reference, the viscoelasticity measurement data (graph) of the test piece produced with the composition of Example 9 is shown in FIG. 1 (note that the unit of the horizontal axis is Celsius, not Kelvin, and the vertical axis has a logarithmic scale).

Production of Laminated Film for Performance Evaluation

The film-forming resin composition prepared above was applied to a square thermoplastic polyurethane film having a thickness of 150 μm and a side length of 100 mm×100 mm by means of a bar coater #34. This was followed by curing at 80° C. for 16 hours and then allowing to stand at room temperature for 1 hour to obtain a cured film having a coating thickness of 20 μm. Various performance evaluations were carried out using the laminated film thus obtained.

Performance Evaluation

Stretchability And Workability of Cured Film (Measurement of Stretch Rate)

The following evaluation was carried out using a tensile tester (AUTOGRAPH AGS-X, manufactured by Shimadzu Corporation).

The laminated film was cut into a strip having a width of 5 mm and a length of 50 mm. The short sides of the cut laminated film were gripped by upper and lower chucks of the tester, and the film was installed such that the distance between the chucks was 10 mm.

The stretch rate (%) of the cured film was calculated according to the following equation from a displacement length x in a case where the upper chuck was moved upward at a speed of 5 mm/min and then the cured film surface of the laminated film was cracked (in a case where the cured film surface was broken) and an initial chuck distance of 10 mm.

Stretch rate (%)=(x/initial chuck distance)×100

Scratch Self-Healing Properties (25° C., Brass Brush)

A brass brush (wooden handle brass brush 3 rows) was applied to the surface of the cured film of the laminated film in an atmosphere at a temperature of 25° C. and a relative humidity of 60 RH %, and then was reciprocated 10 times under a load of 500 g to make a scratch.

Thereafter, the atmosphere at a temperature of 25° C. and a relative humidity of 60 RH % was maintained, and whether or not the scratch occurred on the surface of the cured film was restored and the time until the scratch was restored were measured. Then, the result was determined according to the following criteria.

5: The scratch heals in less than 1 minute.
4: The scratch heals in equal to or more than 1 minute and less than 10 minutes.
3: The scratch heals in equal to or more than 10 minutes and less than 1 hour.
2: The scratch heals within equal to or more than 1 hour and less than 24 hours.
1: The scratch does not heal within 24 hours.

Scratch Self-Healing Properties (60° C., Brass Brush)

A brass brush (wooden handle brass brush 3 rows) was applied to the surface of the cured film of the laminated film in an atmosphere at a temperature of 25° C. and a relative humidity of 60 RH %, and then was reciprocated 10 times under a load of 500 g to make a scratch.

After that, the laminated film was placed in an atmosphere at a temperature of 60° C. and a relative humidity of 60 RH %, and whether or not the scratch occurred on the surface of the cured product was restored and the time until the scratch was restored were measured.

Then, the result was determined according to the following criteria.

5: The scratch heals in less than 1 minute.
4: The scratch heals in equal to or more than 1 minute and less than 10 minutes.
3: The scratch heals in equal to or more than 10 minutes and less than 1 hour.
2: The scratch heals within equal to or more than 1 hour and less than 24 hours.
1: The scratch does not heal within 24 hours.

Permanent Scratch

A brass brush (wooden handle brass brush 3 rows) was applied to the surface of the cured film of the laminated film in an atmosphere at a temperature of 25° C. and a relative humidity of 60 RH %, and then was reciprocated 5 times in a range of width 5 cm and length 5 cm under a load of 2 kg to make a scratch.

The test plate was placed in an atmosphere at a temperature of 25° C. and a relative humidity of 60 RH % for 24 hours, and the number of scratches having a length of equal to or more than 1 cm was visually confirmed. Then, the result was determined according to the following criteria.

5: There are no scratches.
4: The number of scratches of equal to or more than 1 cm is equal to or more than 1 and less than 10.
3: The number of scratches of equal to or more than 1 cm is equal to or more than 10 and less than 20.
2: The number of scratches of equal to or more than 1 cm is equal to or more than 20 and less than 30.
1: The number of scratches of equal to or more than 1 cm is equal to or more than 30.

Steel Wool Scratch Resistance

Steel wool (No. 0000) was applied to the surface of the cured film of the laminated film in an atmosphere at a temperature of 25° C. and a relative humidity of 60 RH %, and then was reciprocated 10 times in a range of width 5 cm and length 5 cm under a load of 250 g/cm$^2$. This was followed by allowing to stand for 24 hours in an atmosphere at a temperature of 25° C. and a relative humidity of 60 RH %.

Using a haze meter (automatic haze meter TC-HIIIDPK/II, manufactured by Tokyo Denshoku Co., Ltd.), the haze value before the test of the laminated film and the haze value after the test of the laminated film (after allowing to stand for 24 hours) were measured, and ΔHAZE was calculated according to the following equation. The smaller ΔHAZE indicates that the shallow and continuous scratches caused by steel wool are more likely to heal.

ΔHAZE=haze value (%) of film after test−haze value (%) of film before test

Contamination Resistance

The contamination resistance was evaluated using a marker pen ink.

A line having a length of 5 cm was drawn on the cured film surface of the laminated film with Marker Pen Ink Black (manufactured by Teranishi Chemical Industry Co., Ltd.) in an atmosphere at a temperature of 25° C. and a relative humidity of 60 RH %, followed by allowing to stand for 5 minutes.

Then, the state of the drawn line was visually observed. After that, the drawn line was wiped off with tissue paper, and the cured film surface of the laminated film was observed. Then, the result was determined according to the following criteria.

5: The cured film surface repels ink. After wiping off, no mark remains or only a part of the mark remains.
4: The cured film surface repels ink. After wiping off, the mark of drawn line remains thin throughout.
3: The cured film surface repels ink. After wiping off, the mark of drawn line remains thick throughout.
2: The cured film surface does not repel ink at all. After wiping off, the mark of drawn line remains thick throughout.
1: The cured film surface does not repel ink at all. The drawn line cannot be wiped off at all.

Components and amounts of the film-forming resin compositions of Examples and Comparative Examples, hydroxyl values of hydroxy group (OH group)-containing components, equivalent ratios (NCO/OH), viscoelasticity measurement results by the above-mentioned method (various physical properties of cured film, and the like), and the results of the above-mentioned performance evaluation are collectively shown in Tables 5 to 9.

For reference, the performance evaluation using only the thermoplastic polyurethane film is shown in Table 9.

In Comparative Example 3, a cured film could not be obtained, so the viscoelasticity measurement and the performance evaluation were not carried out (the composition of Comparative Example 3 does not contain a polyfunctional isocyanate).

In addition, in Comparative Example 4, bleed-out occurred on the surface of the obtained cured film and it was not in a state ready for practical use, so the viscoelasticity measurement and the performance evaluation were not carried out (it is assumed that the resin B-4 having no hydroxy group did not cross-link with the polyfunctional isocyanate and bled out).

TABLE 5

| Example/Comparative Example No. | | | | Example 1 | Example 2 | Example 3 | Example 4 | Example 5 |
|---|---|---|---|---|---|---|---|---|
| Composition components | OH group-containing components | Polyurethane resin (A) | Resin No. | A-1 | A-1 | A-1 | A-1 | A-1 |
| | | | Amount | 100 | 100 | 100 | 100 | 100 |
| | | (Meth)acrylic resin (B) | Resin No. | B-1 | B-2 | B-2 | B-2 | B-2 |
| | | | Amount | 5 | 5 | 20 | 40 | 60 |
| | | Polysiloxane compound (D) | BYK-370 | | | | | |
| | | Polyol (E) | PLACCEL 410D | | | | | |
| | Polyfunctional isocyanate (C) | | DURANATE TKA-100 | 23 | 23 | 26 | 31 | 35 |
| | | | DURANATE 24A-100 | | | | | |
| | | | DURANATE P301-75E | | | | | |
| | | | TAKENATE D-178NL | | | | | |
| | | | DEATH MODULE Z4470BA | | | | | |
| Hydroxyl value (mgKOH/g) of OH group-containing components | | | Polyurethane resin (A) | 64 | 64 | 64 | 64 | 64 |
| | | | (Meth)acrylic resin (B) | 99 | 62 | 62 | 62 | 62 |
| | | | Polysiloxane compound (D) | | | | | |
| | | | Polyol (E) | | | | | |
| | | | Hydroxyl value of above 4 components as a whole | 66 | 64 | 64 | 63 | 63 |
| Equivalent ratio (NCO/OH) | | | | 1.0 | 1.0 | 1.0 | 1.0 | 1.0 |
| Viscoelasticity measurement results Various physical properties of cured film | | | Glass transition temperature (° C.) | 13 | 12 | 14 | 17 | 15 |
| | | | Tanδ peak value (tanδ at glass transition temperature) | 1.40 | 1.54 | 1.42 | 1.29 | 1.30 |
| | | | $E'_{min}$ (rubber plateau (minimum value)) | 3.8E+06 | 3.9E+06 | 3.5E+06 | 4.4E+06 | 4.1E+06 |
| | | | T(k) (absolute temperature at $E'_{min}$) | 335.1 | 331.2 | 325.9 | 322.5 | 326.8 |
| | | | Cross-linking density $n = E'_{min}/3RT$ (mol/cm$^3$) | 4.53E−04 | 4.67E−04 | 4.32E−04 | 5.46E−04 | 4.98E−04 |
| Performance evaluation | Stretchability: stretch rate (%) of cured film | | | >500 | >500 | >500 | 500 | 406 |
| | Scratch resistance | | Scratch-healing properties (25° C., brass brush) | 4 | 5 | 5 | 5 | 5 |
| | | | Scratch-healing properties (60° C., brass brush) | 5 | 5 | 5 | 5 | 5 |
| | | | Permanent scratch | 5 | 5 | 4 | 4 | 3 |
| | | | Steel wool scratch resistance (ΔHAZE (%)) | 2.4 | 0.1 | 0.2 | 0.3 | 0.4 |
| | Contamination resistance (marker stain resistance) | | | 4 | 4 | 4 | 4 | 4 |

| Example/Comparative Example No. | | | | Example 6 | Example 7 | Example 8 |
|---|---|---|---|---|---|---|
| Composition components | OH group-containing components | Polyurethane resin (A) | Resin No. | A-2 | A-2 | A-2 |
| | | | Amount | 100 | 100 | 100 |
| | | (Meth)acrylic resin (B) | Resin No. | B-2 | B-2 | B-2 |
| | | | Amount | 5 | 20 | 40 |
| | | Polysiloxane compound (D) | BYK-370 | | | |
| | | Polyol (E) | PLACCEL 410D | | | |
| | Polyfunctional isocyanate (C) | | DURANATE TKA-100 | 23 | 26 | 31 |
| | | | DURANATE 24A-100 | | | |
| | | | DURANATE P301-75E | | | |
| | | | TAKENATE D-178NL | | | |
| | | | DEATH MODULE Z4470BA | | | |
| Hydroxyl value (mgKOH/g) of OH group-containing components | | | Polyurethane resin (A) | 64 | 64 | 64 |
| | | | (Meth)acrylic resin (B) | 62 | 62 | 62 |
| | | | Polysiloxane compound (D) | | | |
| | | | Polyol (E) | | | |
| | | | Hydroxyl value of above 4 components as a whole | 64 | 64 | 63 |
| Equivalent ratio (NCO/OH) | | | | 1.0 | 1.0 | 1.0 |
| Viscoelasticity measurement results Various physical properties of cured film | | | Glass transition temperature (° C.) | 0 | 3 | 7 |
| | | | Tanδ peak value (tanδ at glass transition temperature) | 1.44 | 1.30 | 1.19 |
| | | | $E'_{min}$ (rubber plateau (minimum value)) | 2.1E+06 | 2.6E+06 | 3.1E+06 |
| | | | T(k) (absolute temperature at $E'_{min}$) | 320.5 | 316.7 | 314.0 |
| | | | Cross-linking density $n = E'_{min}/3RT$ (mol/cm$^3$) | 2.59E−04 | 3.24E−04 | 3.93E−04 |

TABLE 5-continued

| | | | | | |
|---|---|---|---|---|---|
| Performance evaluation | Stretchability: stretch rate (%) of cured film | | >500 | 396 | 255 |
| | Scratch resistance | Scratch-healing properties (25° C., brass brush) | 5 | 5 | 5 |
| | | Scratch-healing properties (60° C., brass brush) | 5 | 5 | 5 |
| | | Permanent scratch | 4 | 4 | 3 |
| | | Steel wool scratch resistance (ΔHAZE (%)) | 5.5 | 3.2 | 2.6 |
| | Contamination resistance (marker stain resistance) | | 4 | 4 | 4 |

TABLE 6

| | | | | Example 9 | Example 10 | Example 11 | Example 12 |
|---|---|---|---|---|---|---|---|
| Composition components | OH group-containing components | Polyurethane resin (A) | Resin No. | A-3 | A-3 | A-3 | A-4 |
| | | | Amount | 100 | 100 | 100 | 100 |
| | | (Meth)acrylic resin (B) | Resin No. | B-2 | B-2 | B-2 | B-2 |
| | | | Amount | 5 | 20 | 40 | 5 |
| | | Polysiloxane compound (D) | BYK-370 | | | | |
| | | Polyol (E) | PLACCEL 410D | | | | |
| | Polyfunctional isocyanate (C) | | DURANATE TKA-100 | 23 | 26 | 30 | 23 |
| | | | DURANATE 24A-100 | | | | |
| | | | DURANATE P301-75E | | | | |
| | | | TAKENATE D-178NL | | | | |
| | | | DEATH MODULE Z4470BA | | | | |
| Hydroxyl value (mgKOH/g) of OH group-containing components | | Polyurethane resin (A) | | 64 | 64 | 64 | 64 |
| | | (Meth)acrylic resin (B) | | 62 | 62 | 62 | 62 |
| | | Polysiloxane compound (D) | | | | | |
| | | Polyol (E) | | | | | |
| | | Hydroxyl value of above 4 components as a whole | | 64 | 64 | 63 | 64 |
| Equivalent ratio (NCO/OH) | | | | 1.0 | 1.0 | 1.0 | 1.0 |
| Viscoelasticity measurement results Various physical properties of cured film | | Glass transition temperature (° C.) | | 31 | 32 | 31 | 45 |
| | | Tanδ peak value (tanδ at glass transition temperature) | | 1.82 | 1.70 | 1.60 | 2.10 |
| | | $E'_{min}$ (rubber plateau (minimum value)) | | 2.1E+06 | 2.3E+06 | 2.9E+06 | 1.8E+06 |
| | | T(k) (absolute temperature at $E'_{min}$) | | 356.7 | 378.5 | 372.2 | 392.8 |
| | | Cross-linking density $n = E'_{min}/3RT$ (mol/cm$^3$) | | 2.39E−04 | 2.42E−04 | 3.07E−04 | 1.81E−04 |
| Performance evaluation | Stretchability: stretch rate (%) of cured film | | | >500 | >500 | 492 | >500 |
| | Scratch resistance | Scratch-healing properties (25° C., brass brush) | | 5 | 5 | 5 | 4 |
| | | Scratch-healing properties (60° C., brass brush) | | 5 | 5 | 5 | 4 |
| | | Permanent scratch | | 5 | 5 | 5 | 5 |
| | | Steel wool scratch resistance (ΔHAZE (%)) | | 0.6 | 0.7 | 1.0 | 1.9 |
| | Contamination resistance (marker stain resistance) | | | 4 | 4 | 4 | 4 |

| | | | | Example 13 | Example 14 |
|---|---|---|---|---|---|
| | Composition components | OH group-containing components | Polyurethane resin (A) | Resin No. | A-4 | A-4 |
| | | | Amount | 100 | 100 |
| | | (Meth)acrylic resin (B) | Resin No. | B-2 | B-2 |
| | | | Amount | 20 | 40 |
| | | Polysiloxane compound (D) | BYK-370 | | |
| | | Polyol (E) | PLACCEL 410D | | |
| | Polyfunctional isocyanate (C) | | DURANATE TKA-100 | 26 | 30 |
| | | | DURANATE 24A-100 | | |
| | | | DURANATE P301-75E | | |
| | | | TAKENATE D-178NL | | |
| | | | DEATH MODULE Z4470BA | | |
| Hydroxyl value (mgKOH/g) of OH group-containing components | | Polyurethane resin (A) | | 64 | 64 |
| | | (Meth)acrylic resin (B) | | 62 | 62 |
| | | Polysiloxane compound (D) | | | |
| | | Polyol (E) | | | |
| | | Hydroxyl value of above 4 components as a whole | | 64 | 63 |

TABLE 6-continued

|  |  |  | | |
|---|---|---|---|---|
| Equivalent ratio (NCO/OH) | | | 1.0 | 1.0 |
| Viscoelasticity measurement results<br>Various physical properties of cured film | | Glass transition temperature (° C.) | 42 | 42 |
| | | Tanδ peak value (tanδ at glass transition temperature) | 2.08 | 1.82 |
| | | $E'_{min}$ (rubber plateau (minimum value)) | 1.9E+06 | 4.1E+06 |
| | | T(k) (absolute temperature at $E'_{min}$) | 381.2 | 373.0 |
| | | Cross-linking density $n = E'_{min}/3RT$ (mol/cm$^3$) | 2.04E−04 | 4.43E−04 |
| Performance evaluation | Stretchability: stretch rate (%) of cured film | | >500 | 496 |
| | Scratch resistance | Scratch-healing properties (25° C., brass brush) | 3 | 3 |
| | | Scratch-healing properties (60° C., brass brush) | 4 | 4 |
| | | Permanent scratch | 5 | 5 |
| | | Steel wool scratch resistance (ΔHAZE (%)) | 1.9 | 1.1 |
| | Contamination resistance (marker stain resistance) | | 4 | 4 |

TABLE 7

| Example/Comparative Example No. | | | | Example 15 | Example 16 | Example 17 | Example 18 |
|---|---|---|---|---|---|---|---|
| Composition components | OH group-containing components | Polyurethane resin (A) | Resin No. | A-1 | A-1 | A-5 | A-6 |
| | | | Amount | 100 | 100 | 100 | 100 |
| | | (Meth)acrylic resin (B) | Resin No. | B-2 | B-2 | B-1 | B-1 |
| | | | Amount | 5 | 50 | 5 | 5 |
| | | Polysiloxane compound (D) | BYK-370 | | | | |
| | | Polyol (E) | PLACCEL 410D | 20 | 850 | | |
| | Polyfunctional isocyanate (C) | | DURANATE TKA-100 | 38 | 690 | 23 | 23 |
| | | | DURANATE 24A-100 | | | | |
| | | | DURANATE P301-75E | | | | |
| | | | TAKENATE D-178NL | | | | |
| | | | DEATH MODULE Z4470BA | | | | |
| Hydroxyl value (mgKOH/g) of OH group-containing components | | Polyurethane resin (A) | | 64 | 64 | 64 | 66 |
| | | (Meth)acrylic resin (B) | | 62 | 62 | 99 | 99 |
| | | Polysiloxane compound (D) | | | | | |
| | | Polyol (E) | | 224 | 224 | | |
| | | Hydroxyl value of above 4 components as a whole | | 90 | 200 | 66 | 68 |
| Equivalent ratio (NCO/OH) | | | | 1.0 | 1.0 | 1.0 | 1.0 |
| Viscoelasticity measurement results<br>Various physical properties of cured film | | | Glass transition temperature (° C.) | 12 | 22 | 3 | 0 |
| | | | Tanδ peak value (tanδ at glass transition temperature) | 1.51 | 1.19 | 1.52 | 1.51 |
| | | | $E'_{min}$ (rubber plateau (minimum value)) | 6.0E+06 | 1.2E+07 | 4.0E+06 | 3.9E+06 |
| | | | T(k) (absolute temperature at $E'_{min}$) | 311.4 | 330.3 | 311.0 | 311.0 |
| | | | Cross-linking density $n = E'_{min}/3RT$ (mol/cm$^3$) | 7.75E−04 | 1.51E−03 | 5.16E−04 | 5.03E−04 |
| Performance evaluation | Stretchability: stretch rate (%) of cured film | | | 322 | 169 | >500 | >500 |
| | Scratch resistance | | Scratch-healing properties (25° C., brass brush) | 5 | 5 | 5 | 5 |
| | | | Scratch-healing properties (60° C., brass brush) | 5 | 5 | 5 | 5 |
| | | | Permanent scratch | 5 | 4 | 4 | 4 |
| | | | Steel wool scratch resistance (ΔHAZE (%)) | 1.5 | 1.5 | 4.5 | 4.0 |
| | Contamination resistance (marker stain resistance) | | | 5 | 5 | 4 | 4 |

| Example/Comparative Example No. | | | | Example 19 | Example 20 | Example 21 |
|---|---|---|---|---|---|---|
| Composition components | OH group-containing components | Polyurethane resin (A) | Resin No. | A-7 | A-8 | A-9 |
| | | | Amount | 100 | 100 | 100 |
| | | (Meth)acrylic resin (B) | Resin No. | B-1 | B-1 | B-1 |
| | | | Amount | 5 | 5 | 5 |
| | | Polysiloxane compound (D) | BYK-370 | | | |
| | | Polyol (E) | PLACCEL 410D | | | |
| | Polyfunctional isocyanate (C) | | DURANATE TKA-100 | 24 | 24 | 23 |
| | | | DURANATE 24A-100 | | | |
| | | | DURANATE P301-75E | | | |
| | | | TAKENATE D-178NL | | | |
| | | | DEATH MODULE Z4470BA | | | |

TABLE 7-continued

| | | | | | |
|---|---|---|---|---|---|
| Hydroxyl value (mgKOH/g) of OH group-containing components | | Polyurethane resin (A) | 68 | 68 | 64 |
| | | (Meth)acrylic resin (B) | 99 | 99 | 99 |
| | | Polysiloxane compound (D) | | | |
| | | Polyol (E) | | | |
| | | Hydroxyl value of above 4 components as a whole | 69 | 69 | 66 |
| Equivalent ratio (NCO/OH) | | | 1.0 | 1.0 | 1.0 |
| Viscoelasticity measurement results Various physical properties of cured film | | Glass transition temperature (° C.) | 15 | −10 | −6 |
| | | Tanδ peak value (tanδ at glass transition temperature) | 1.42 | 1.48 | 1.45 |
| | | $E'_{min}$ (rubber plateau (minimum value)) | 3.6E+06 | 3.5E+06 | 3.2E+06 |
| | | T(k) (absolute temperature at $E'_{min}$) | 333.0 | 300.0 | 302.0 |
| | | Cross-linking density $n = E'_{min}/3RT$ (mol/cm³) | 4.33E−04 | 4.68E−04 | 4.25E−04 |
| Performance evaluation | Stretchability: stretch rate (%) of cured film | | >500 | >500 | >500 |
| | Scratch resistance | Scratch-healing properties (25° C., brass brush) | 4 | 5 | 5 |
| | | Scratch-healing properties (60° C., brass brush) | 5 | 5 | 5 |
| | | Permanent scratch | 5 | 5 | 5 |
| | | Steel wool scratch resistance (ΔHAZE (%)) | 2.2 | 5.2 | 5.0 |
| | Contamination resistance (marker stain resistance) | | 4 | 4 | 4 |

TABLE 8

| Example/Comparative Example No. | | | | Example 22 | Example 23 | Example 24 | Example 25 |
|---|---|---|---|---|---|---|---|
| Composition components | OH group-containing components | Polyurethane resin (A) | Resin No. | A-10 | A-11 | A-1 | A-1 |
| | | | Amount | 100 | 100 | 100 | 100 |
| | | (Meth)acrylic resin (B) | Resin No. | B-1 | B-1 | B-1 | B-1 |
| | | | Amount | 5 | 5 | 5 | 5 |
| | | Polysiloxane compound (D) | BYK-370 | | | | |
| | | Polyol (E) | PLACCEL 410D | | | | |
| | Polyfunctional isocyanate (C) | | DURANATE TKA-100 | 23 | 24 | | |
| | | | DURANATE 24A-100 | | | 22 | |
| | | | DURANATE P301-75E | | | | 31 |
| | | | TAKENATE D-178NL | | | | |
| | | | DEATH MODULE Z4470BA | | | | |
| Hydroxyl value (mgKOH/g) of OH group-containing components | | Polyurethane resin (A) | | 63 | 68 | 64 | 64 |
| | | (Meth)acrylic resin (B) | | 99 | 99 | 99 | 99 |
| | | Polysiloxane compound (D) | | | | | |
| | | Polyol (E) | | | | | |
| | | Hydroxyl value of above 4 components as a whole | | 65 | 69 | 66 | 66 |
| Equivalent ratio (NCO/OH) | | | | 1.0 | 1.0 | 1.0 | 1.0 |
| Viscoelasticity measurement results Various physical properties of cured film | | Glass transition temperature (° C.) | | 12 | 18 | 13 | 12 |
| | | Tan δ peak value (tan δ at glass transition temperature) | | 1.39 | 1.39 | 1.34 | 1.38 |
| | | $E'_{min}$ (rubber plateau (minimum value)) | | 3.3E+06 | 3.4E+06 | 3.8E+06 | 3.4E+06 |
| | | T(k) (absolute temperature at $E'_{min}$) | | 323.0 | 325.0 | 322.0 | 320.0 |
| | | Cross-linking density $n = E'_{min}/3RT$ (mol/cm³) | | 4.10E−04 | 4.19E−04 | 4.73E−04 | 4.26E−04 |
| Performance evaluation | Stretchability: stretch rate (%) of cured film | | | >500 | >500 | >500 | >500 |
| | Scratch resistance | Scratch-healing properties (25° C., brass brush) | | 4 | 4 | 4 | 4 |
| | | Scratch-healing properties (60° C., brass brush) | | 5 | 5 | 5 | 5 |
| | | Permanent scratch | | 5 | 5 | 5 | 5 |
| | | Steel wool scratch resistance (ΔHAZE (%)) | | 2.1 | 2.2 | 1.8 | 2.5 |
| | Contamination resistance (marker stain resistance) | | | 4 | 4 | 4 | 4 |

| Example/Comparative Example No. | | | | Example 26 | Example 27 | Example 28 |
|---|---|---|---|---|---|---|
| Composition components | OH group-containing components | Polyurethane resin (A) | Resin No. | A-1 | A-1 | A-1 |
| | | | Amount | 100 | 100 | 100 |
| | | (Meth)acrylic resin (B) | Resin No. | B-1 | B-3 | B-3 |
| | | | Amount | 5 | 5 | 5 |
| | | Polysiloxane compound (D) | BYK-370 | | | 1 |
| | | Polyol (E) | PLACCEL 410D | | | |

TABLE 8-continued

|  |  |  |  |  |  |
|---|---|---|---|---|---|
|  | Polyfunctional isocyanate (C) | DURANATE TKA-100 |  | 23 | 23 |
|  |  | DURANATE 24A-100 |  |  |  |
|  |  | DURANATE P301-75E |  |  |  |
|  |  | TAKENATE D-178NL |  |  |  |
|  |  | DEATH MODULE Z4470BA | 30 |  |  |
| Hydroxyl value (mgKOH/g) of OH | Polyurethane resin (A) | 64 | 64 | 64 |  |
| group-containing components | (Meth)acrylic resin (B) | 99 | 62 | 62 |  |
|  | Polysiloxane compound (D) |  |  | 35 |  |
|  | Polyol (E) |  |  |  |  |
|  | Hydroxyl value of above 4 components as a whole | 66 | 64 | 64 |  |
| Equivalent ratio (NCO/OH) |  |  | 1.0 | 1.0 | 1.0 |
| Viscoelasticity measurement results Various physical properties of cured film | Glass transition temperature (° C.) | 50 | 11 | 10 |  |
|  | Tan δ peak value (tan δ at glass transition temperature) | 1.25 | 1.55 | 1.40 |  |
|  | E'$_{min}$ (rubber plateau (minimum value)) | 3.6E+06 | 3.7E+06 | 3.6E+06 |  |
|  | T(k) (absolute temperature at E'$_{min}$) | 360.0 | 326.6 | 325.0 |  |
|  | Cross-linking density n = E'$_{min}$/3RT (mol/cm$^3$) | 4.01E−04 | 4.49E−04 | 4.44E−04 |  |
| Performance evaluation | Stretchability: stretch rate (%) of cured film | >500 | >500 | >500 |  |
|  | Scratch resistance | Scratch-healing properties (25° C., brass brush) | 3 | 5 | 5 |
|  |  | Scratch-healing properties (60° C., brass brush) | 4 | 5 | 5 |
|  |  | Permanent scratch | 5 | 4 | 4 |
|  |  | Steel wool scratch resistance (ΔHAZE (%)) | 1.2 | 1.5 | 1.2 |
|  | Contamination resistance (marker stain resistance) |  | 4 | 1 | 4 |

TABLE 9

|  |  |  |  | Example/Comparative Example No. | | | |
|---|---|---|---|---|---|---|---|
|  |  |  |  | Comparative Example 1 | Comparative Example 2 | Comparative Example 3 | Comparative Example 4 |
| Composition components | OH group-containing components | Polyurethane resin (A) | Resin No. |  | A-2 | A-1 | A-1 |
|  |  |  | Amount | 0 | 100 | 100 | 100 |
|  |  | (Meth)acrylic resin (B) | Resin No. | B-1 |  | B-2 | B-4 |
|  |  |  | Amount | 100 | 0 | 5 | 5 |
|  |  | Polysiloxane compound (D) | BYK-370 |  |  |  |  |
|  |  | Polyol (E) | PLACCEL 410D |  |  |  |  |
|  | Polyfunctional isocyanate (C) |  | DURANATE TKA-100 | 34 | 22 | Not contained | 21 |
|  |  |  | DURANATE 24A-100 |  |  |  |  |
|  |  |  | DURANATE P301-75E |  |  |  |  |
|  |  |  | TAKENATE D-178NL |  |  |  |  |
|  |  |  | DEATH MODULE Z4470BA |  |  |  |  |
| Hydroxyl value (mgKOH/g) of OH group-containing components | Polyurethane resin (A) |  |  | 64 | 64 | 64 |  |
|  | (Meth)acrylic resin (B) |  | 99 |  | 62 | 0 |  |
|  | Polysiloxane compound (D) |  |  |  |  |  |  |
|  | Polyol (E) |  |  |  |  |  |  |
|  | Hydroxyl value of above 4 components as a whole |  | 99 | 64 | 64 | 61 |  |
| Equivalent ratio (NCO/OH) |  |  |  | 1.0 | 1.0 | — | 1.0 |
| Viscoelasticity measurement results Various physical properties of cured film | Glass transition temperature (° C.) |  | 110 | 1 | Not measured | Not measured |  |
|  | Tan δ peak value (tan δ at glass transition temperature) |  | 0.70 | 1.49 |  |  |  |
|  | E'$_{min}$ (rubber plateau (minimum value)) |  | 3.1E+07 | 3.7E+06 |  |  |  |
|  | T(k) (absolute temperature at E'$_{min}$) |  | 409.4 | 320.8 |  |  |  |
|  | Cross-linking density n = E'$_{min}$/3RT (mol/cm$^3$) |  | 3.09E−03 | 4.64E−04 |  |  |  |
| Performance evaluation | Stretchability: stretch rate (%) of cured film |  |  | 80 | >500 | Not evaluated | Not evaluated |
|  | Scratch resistance | Scratch-healing properties (25° C., brass brush) |  | 1 | 5 |  |  |
|  |  | Scratch-healing properties (60° C., brass brush) |  | 1 | 5 |  |  |
|  |  | Permanent scratch |  | 1 | 4 |  |  |
|  |  | Steel wool scratch resistance (ΔHAZE (%)) |  | 7.1 | 11.0 |  |  |
|  | Contamination resistance (marker stain resistance) |  |  | 5 | 1 |  |  |

TABLE 9-continued

| | | | | Example/Comparative Example No. Comparative Example 5 | Remarks |
|---|---|---|---|---|---|
| Composition components | OH group-containing components | Polyurethane resin (A) | Resin No. | A-1 | Thermoplastic polyurethane film only (no coating) |
| | | | Amount | 100 | |
| | | (Meth)acrylic resin (B) | Resin No. | B-1 | |
| | | | Amount | 5 | |
| | | Polysiloxane compound (D) | BYK-370 | | |
| | | Polyol (E) | PLACCEL 410D | | |
| | Polyfunctional isocyanate (C) | | DURANATE TKA-100 | | |
| | | | DURANATE 24A-100 | | |
| | | | DURANATE P301-75E | | |
| | | | TAKENATE D-178NL | 27 | |
| | | | DEATH MODULE Z4470BA | | |
| Hydroxyl value (mgKOH/g) of OH group-containing components | | | Polyurethane resin (A) | 64 | |
| | | | (Meth)acrylic resin (B) | 99 | |
| | | | Polysiloxane compound (D) | | |
| | | | Polyol (E) | | |
| | | | Hydroxyl value of above 4 components as a whole | 66 | |
| Equivalent ratio (NCO/OH) | | | | 1.0 | |
| Viscoelasticity measurement results Various physical properties of cured film | | | Glass transition temperature (° C.) | 5 | 7 |
| | | | Tanδ peak value (tanδ at glass transition temperature) | 1.73 | |
| | | | $E'_{min}$ (rubber plateau (minimum value)) | <1.0E+5 | |
| | | | T(k) (absolute temperature at $E'_{min}$) | >433 | |
| | | | Cross-linking density $n = E'_{min}/3RT$ (mol/cm$^3$) | <9.3E−06 | |
| Performance evaluation | | Stretchability: stretch rate (%) of cured film | | >500 | >500 |
| | | Scratch resistance | Scratch-healing properties (25° C., brass brush) | 5 | 1 |
| | | | Scratch-healing properties (60° C., brass brush) | 5 | 1 |
| | | | Permanent scratch | 1 | 1 |
| | | | Steel wool scratch resistance (ΔHAZE (%)) | 7.5 | 7.1 |
| | | Contamination resistance (marker stain resistance) | | 2 | 1 |

In Tables 5 to 9, the "Hydroxyl value of above 4 components as a whole" means a hydroxyl value obtained by averaging hydroxyl values of the polyurethane resin (A), the (meth)acrylic resin (B), the polysiloxane compound (D), and the polyol (E) in each composition, taking into account the amounts of each component used. (In other words, it is the hydroxyl value of the composition (mixture of a plurality of components) excluding the polyfunctional isocyanate (C) and the solvent from each composition.)

Details of the isocyanate compounds in Tables 5 to 9 are as follows.

TABLE 10

| Product name | Manufacturer | Skeleton | Modification | Solid content (% by mass) | NCO % |
|---|---|---|---|---|---|
| DURANATE TKA-100 | Asahi Kasei Corporation | HDI | Isocyanurate-modified | 100 | 21.7 |
| DURANATE 24A-100 | Asahi Kasei Corporation | HDI | Biuret-modified | 100 | 23.5 |
| DURANATE P301-75E | Asahi Kasei Corporation | HDI | Adduct-modified | 75 | 12.5 |
| TAKENATE D-178NL | Mitsui Chemicals, Inc. | HDI | Allophanate-modified, difunctional | 100 | 19.2 |
| DEATH MODULE Z4470BA | Sumika Bayer Urethane Co., Ltd. | IPDI | Isocyanurate-modified | 70 | 11.9 |

HDI: abbreviation of hexamethylene diisocyanate
IPDI: abbreviation of isophorone diisocyanate The polysiloxane compound "BYK-370" in Tables 5 to 9 is polyester-modified polydimethylsiloxane having a hydroxyl group (solid content: 25% by mass, hydroxyl value: 8.8 mgKOH/g) manufactured by BYK Japan K.K. The amounts shown in Tables 5 to 9 are amounts in terms of solid content.

The polyol compound "PLACCEL 410D" in Tables 5 to 9 is polycaprolactone tetraol (molecular weight: 1000, hydroxyl value: 216 to 232 mgKOH/g) manufactured by Daicel Corporation.

In the viscoelasticity measurement results of Tables 5 to 9, the numerical values of (Pa) and cross-linking density are in the exponential expression. For example, "3.9E+06" means $3.9\times10^6$, and "4.53E-04" means $4.53\times10^{-4}$.

Analysis of Results

As shown in Examples 1 to 28, in a case of forming a cured film from a film-forming resin composition containing a polyurethane resin (A) having a hydroxy group, a (meth)acrylic resin (B) having a hydroxy group, and a polyfunctional isocyanate (C) and having a cross-linking density n defined by Mathematical Formula (1) of $1.0\times10^{-4}$ to $5.0\times10^{-3}$ mol/cm$^3$, a film having stretchablility and good scratch resistance (evaluation of permanent scratch) could be obtained. On the other hand, the evaluation results using the film-forming resin compositions of Comparative Examples 1 to 5, in which one of the components corresponding to (A) to (C) is not contained or in which all the components corresponding to (A) to (C) are contained and the value of the cross-linking density is out of a predetermined range, were not satisfactory.

A closer look at Examples 1 to 28 reveals the following.

In each Example, not only stretchability and scratch resistance (permanent scratch resistance, steel wool scratch resistance) but also scratch-healing properties are good.

From the comparison of Example 27 and Example 28, contamination resistance (marker stain resistance) can be improved by additionally using a polysiloxane compound having a hydroxy group. In addition, Examples 1 to 26 using the resin (B-1 or B-2) having a polysiloxane partial structure as the resin (B) also have good contamination resistance (marker stain resistance).

From the comparison of Examples 15 and 16 with other Examples, contamination resistance (marker stain resistance) can be further improved by additionally using the polyol.

This application claims the priority on the basis of Japanese Patent Application No. 2018-045055 filed on Mar. 13, 2018, the disclosure of which is incorporated by reference herein in its entirety.

The invention claimed is:

1. A film-forming resin composition for protecting a surface of an article, on which an organic polymer is exposed, comprising:
    a polyurethane resin (A) having a hydroxy group;
    a (meth)acrylic resin (B) having a hydroxy group; and
    a polyfunctional isocyanate (C),
    wherein a cured film obtained by curing the resin composition at 80° C. for 16 hours has a cross-linking density n of $1.0\times10^{-4}$ to $5.0\times10^{-3}$ mol/cm$^3$, which is determined from a minimum value E'min of storage elastic modulus of the cured film in a case where the cured film is subjected to viscoelasticity measurement at a frequency of 1.0 Hz and a temperature range of −40° C. to 160° C., an absolute temperature T at the minimum value E'min, and a gas constant R, according to Mathematical Formula (1)
    Mathematical Formula (1): n=E'min/(3RT), and
    wherein a cured film obtained by curing the resin composition at 80° C. for 16 hours has a glass transition temperature of −20° C. to 60° C. obtained in a case where the cured film is subjected to viscoelasticity measurement at a frequency of 1.0 Hz and a temperature range of −40° C. to 160° C., and has a loss tangent (tan δ) of equal to or more than 0.5 at the glass transition temperature.

2. The film-forming resin composition according to claim 1, wherein the polyurethane resin (A) having a hydroxy group has a weight average molecular weight of 1,000 to 50,000.

3. The film-forming resin composition according to claim 1, wherein the (meth)acrylic resin (B) has a hydroxyl value of 10 to 200 mgKOH/g.

4. The film-forming resin composition according to claim 1, wherein the polyurethane resin (A) has at least any partial structure selected from the group consisting of polycaprolactone, polycaprolactam, polycarbonate, polyester, and polyether.

5. The film-forming resin composition according to claim 1, wherein the (meth)acrylic resin (B) has at least any partial structure selected from the group consisting of polycaprolactone, polycaprolactam, polycarbonate, polyester, and polyether.

6. The film-forming resin composition according to claim 1, wherein the polyurethane resin (A) and/or the (meth)acrylic resin (B) has a polysiloxane partial structure.

7. The film-forming resin composition according to claim 1, further comprising:
    a polysiloxane compound (D) having a hydroxy group.

8. The film-forming resin composition according to claim 1, further comprising:
    a polyol (E) as a component different from the polyurethane resin (A).

9. A laminated film for protecting a surface of an article, on which an organic polymer is exposed, comprising:
    a base material layer; and
    a protective layer,
    wherein the protective layer has a cross-linking density n of $1.0\times10^{-4}$ to $5.0\times10^{-3}$ mol/cm$^3$, which is determined from a minimum value E'min of storage elastic modulus of the protective layer in a case where the protective layer is subjected to viscoelasticity measurement at a frequency of 1.0 Hz and a temperature range of −40° C. to 160° C., an absolute temperature T at the minimum value E'min, and a gas constant R, according to Mathematical Formula (1),
    wherein the protective layer has a glass transition temperature of −20° C. to 60° C. obtained in a case where the protective layer is subjected to viscoelasticity measurement at a frequency of 1.0 Hz and a temperature range of −40° C. to 160° C., and has a loss tangent (tan δ) of equal to or more than 0.5 at the glass transition temperature
    Mathematical Formula (1): n=E'min/(3RT), and
    wherein the protective layer is a cured product of a film-forming resin composition comprising:
    a polyurethane resin (A) having a hydroxy group;
    a (meth)acrylic resin (B) having a hydroxy group; and
    a polyfunctional isocyanate (C).

10. The laminated film according to claim 9, wherein a material of the base material layer is at least any selected from the group consisting of polyester, polyurethane, polyvinyl chloride, triacetyl cellulose, polyacrylic resin, polycarbonate, and thermoplastic polyimide.

11. An article to which the laminated film according to claim 9 is attached.

* * * * *